(12) United States Patent
Kobayashi

(10) Patent No.: US 12,348,887 B2
(45) Date of Patent: Jul. 1, 2025

(54) PHOTOELECTRIC CONVERSION DEVICE

(71) Applicant: CANON KABUSHIKI KAISHA, Tokyo (JP)

(72) Inventor: Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 17/816,097

(22) Filed: Jul. 29, 2022

(65) Prior Publication Data

US 2023/0041974 A1 Feb. 9, 2023

(30) Foreign Application Priority Data

Aug. 4, 2021 (JP) .................................. 2021-128516

(51) Int. Cl.
*G06K 9/00* (2022.01)
*G01C 3/02* (2006.01)
(Continued)

(52) U.S. Cl.
CPC ............... *H04N 25/78* (2023.01); *G01C 3/02* (2013.01); *G06T 7/50* (2017.01); *G06T 2207/10028* (2013.01); *H04N 25/51* (2023.01)

(58) Field of Classification Search
CPC ........ H04N 25/50; H04N 25/75; H04N 25/78; H04N 25/51; H04N 25/616; H04N 25/79; G01C 3/02; G06T 7/50; G06T 2207/10028
See application file for complete search history.

(56) References Cited

U.S. PATENT DOCUMENTS 7,990,440 B2   8/2011  Kobayashi
8,427,551 B2 * 4/2013  Suzuki .................. H04N 25/76
                                                    348/222.1
(Continued)

FOREIGN PATENT DOCUMENTS

JP   2011-71958 A   4/2011
JP   2012-4727 A    1/2012
(Continued)

OTHER PUBLICATIONS

U.S. Appl. No. 17/971,797, filed Oct. 24, 2022, by Hideo Kobayashi.
(Continued)

*Primary Examiner* — Shervin K Nakhjavan
(74) *Attorney, Agent, or Firm* — VENABLE LLP

(57) ABSTRACT

A photoelectric conversion device including pixels arranged to form rows, a scanning circuit that performs scanning for sequentially outputting a signal from the pixel on a row basis, and a processing circuit that processes a signal output from the pixel. The processing circuit corrects, based on a first reset signal and a second reset signal based on a reset state of the pixel, an optical signal based on incident light. The scanning circuit performs scanning for outputting the optical signal and the first reset signal from the pixel by scans performed in different periods. The scanning circuit performs scanning for outputting the optical signal and the second reset signal from the pixel by a scan. The first reset signal, the second reset signal, and the optical signal are output from the pixel in a frame period in which signals to be used for generating a frame is output.

18 Claims, 17 Drawing Sheets

(51) Int. Cl.
*G06T 7/50* (2017.01)
*H04N 25/78* (2023.01)
*H04N 25/51* (2023.01)

(56) References Cited

U.S. PATENT DOCUMENTS

| | | | |
|---|---|---|---|
| 8,710,558 B2 | 4/2014 | Inoue | |
| 8,835,828 B2 | 9/2014 | Kobayashi | |
| 8,884,391 B2 | 11/2014 | Fudaba | |
| 9,191,598 B2 * | 11/2015 | Blanquart | H04N 25/75 |
| 9,264,641 B2 | 2/2016 | Kobayashi | |
| 9,305,954 B2 | 4/2016 | Kato | |
| 9,357,122 B2 | 5/2016 | Kususaki | |
| 9,407,847 B2 | 8/2016 | Maehashi | |
| 9,438,828 B2 | 9/2016 | Itano | |
| 9,509,931 B2 | 11/2016 | Kobayashi | |
| 9,602,752 B2 | 3/2017 | Kobayashi | |
| 10,015,430 B2 | 7/2018 | Kobayashi | |
| 10,136,082 B2 * | 11/2018 | Oh | H04N 25/616 |
| 10,609,316 B2 | 3/2020 | Kobayashi | |
| 11,082,644 B2 * | 8/2021 | Shim | H04N 25/778 |
| 11,268,851 B2 | 3/2022 | Kobayashi | |
| 11,425,320 B2 * | 8/2022 | Chu | H04N 25/57 |
| 11,431,929 B2 | 8/2022 | Kobayashi | |
| 11,463,644 B2 | 10/2022 | Soda | |
| 11,470,275 B2 | 10/2022 | Kobayashi | |
| 11,496,704 B2 | 11/2022 | Sato | |
| 11,736,832 B2 * | 8/2023 | Wang | H04N 25/745 348/46 |
| 11,825,223 B2 * | 11/2023 | Miyake | H04N 25/65 |
| 12,088,938 B2 * | 9/2024 | Xu | H04N 25/75 |
| 2008/0106622 A1 * | 5/2008 | Turchetta | H04N 25/57 348/E3.018 |
| 2008/0218614 A1 * | 9/2008 | Joshi | H04N 25/587 348/262 |
| 2008/0297609 A1 * | 12/2008 | Song | H04N 25/585 348/E3.018 |
| 2011/0304755 A1 | 12/2011 | Kondo | |
| 2012/0175503 A1 | 7/2012 | Kuroda | |
| 2013/0140440 A1 | 6/2013 | Kobayashi | |
| 2015/0136952 A1 | 5/2015 | Kimura et al. | |
| 2016/0227141 A1 | 8/2016 | Kobayashi | |
| 2017/0244912 A1 * | 8/2017 | Kajimura | H04N 25/585 |
| 2018/0115729 A1 * | 4/2018 | Ise | H04N 23/667 |
| 2021/0021770 A1 | 1/2021 | Nakazawa | |
| 2021/0185251 A1 * | 6/2021 | Yonemoto | H04N 25/709 |
| 2021/0360180 A1 | 11/2021 | Saito | |
| 2022/0030164 A1 | 1/2022 | Kobayashi | |
| 2022/0247964 A1 | 8/2022 | Kobayashi | |
| 2022/0272295 A1 | 8/2022 | Kobayashi | |
| 2022/0302199 A1 | 9/2022 | Kobayashi | |
| 2022/0303484 A1 | 9/2022 | Kobayashi | |
| 2022/0303485 A1 | 9/2022 | Kobayashi | |
| 2022/0303486 A1 | 9/2022 | Kobayashi | |
| 2022/0321812 A1 | 10/2022 | Kobayashi | |
| 2023/0247323 A1 * | 8/2023 | Kitano | H04N 25/53 348/295 |

FOREIGN PATENT DOCUMENTS

| | | |
|---|---|---|
| JP | 2015-100042 A | 5/2015 |
| JP | 2015-130563 A | 7/2015 |
| JP | 2016-526817 A | 9/2016 |
| JP | 2017-139585 A | 8/2017 |
| JP | 2018-23025 A | 2/2018 |
| JP | 2019-197985 A | 11/2019 |
| WO | 2017/104438 A1 | 6/2017 |

OTHER PUBLICATIONS

U.S. Appl. No. 17/900,971, filed Sep. 1, 2022, by Hideo Kobayashi.
U.S. Appl. No. 17/939,225, filed Sep. 7, 2022, by Hideo Kobayashi.
U.S. Appl. No. 17/960,247, filed Oct. 5, 2022, by Hideo Kobayashi.
U.S. Appl. No. 17/963,289, filed Oct. 11, 2022, by Hideo Kobayashi.
Japanese Office Action issued May 20, 2025 during prosecution of related Japanese Application No. 2021-128516. (English-language machine translation included).

* cited by examiner

PHOTOELECTRIC CONVERSION DEVICE

BACKGROUND OF THE INVENTION

Field of the Invention

The present disclosure relates to a photoelectric conversion device.

Description of the Related Art

Japanese Patent Application Laid-Open No. 2012-004727 discloses a solid-state imaging element in which reset levels of a pixel are sampled a plurality of times.

In a photoelectric conversion device in which reset levels are sampled a plurality of times as described in Japanese Patent Application Laid-Open No. 2012-004727, lowering of dynamic resolution may be a problem because the time required for reading one row is long.

SUMMARY OF THE INVENTION

An object of the present disclosure is to provide a photoelectric conversion device capable of improving dynamic resolution.

According to an aspect of the present disclosure, there is provided a photoelectric conversion device comprising a pixel array including a plurality of pixels arranged to form a plurality of rows and each configured to output a signal corresponding to incident light by photoelectric conversion, a scanning circuit configured to perform scanning for sequentially outputting a signal from the pixel on a row basis, and a processing circuit configured to process a signal output from the pixel. The processing circuit corrects, based on a first reset signal and a second reset signal each based on a reset state of the pixel, an optical signal based on the incident light. The scanning circuit performs scanning for outputting the optical signal and the first reset signal from the pixel by scans performed in different periods. The scanning circuit performs scanning for outputting the optical signal and the second reset signal from the pixel by a scan. The first reset signal, the second reset signal, and the optical signal are output from the pixel in a frame period in which signals to be used for generating a frame is output.

According to another aspect of the present disclosure, there is provided a photoelectric conversion device comprising a pixel array including a plurality of pixels arranged to form a plurality of rows and each configured to output a signal corresponding to incident light by photoelectric conversion, and a scanning circuit configured to perform scanning for sequentially outputting a signal from the pixel on a row basis. The scanning circuit performs scanning for outputting a first reset signal based on a reset state of the pixel from the pixel in a first scan, outputting an optical signal based on the incident light from the pixel in a second scan performed in a period different from the first scan, and outputting a second reset signal based on a reset state of the pixel from the pixel in the first scan or the second scan. No optical signal is output from the pixel in the first scan. The first reset signal, the second reset signal, and the optical signal are output from the pixel in a frame period in which signals to be used for generating a frame is output.

According to another aspect of the present disclosure, there is provided a photoelectric conversion device comprising a pixel array including a plurality of pixels arranged to form a plurality of rows, each including a photoelectric conversion unit, and each configured to output a signal corresponding to incident light by photoelectric conversion, a scanning circuit configured to perform scanning for sequentially outputting a signal from the pixel on a row basis, and a processing circuit configured to process a signal output from the pixel. The processing circuit corrects, based on a first reset signal and a second reset signal each based on a reset state of the pixel, an optical signal based on the incident light. The scanning circuit performs scanning for outputting the optical signal and the first reset signal from the pixel by scans performed in different periods. The scanning circuit performs scanning for outputting the optical signal and the second reset signal from the pixel by a single scan. A shutter scan for resetting the photoelectric conversion unit and releasing the reset of the photoelectric conversion unit is performed between a scan for outputting the first reset signal from the pixel and the single scan.

Further features of the present invention will become apparent from the following description of exemplary embodiments with reference to the attached drawings.

DESCRIPTION OF THE EMBODIMENTS

Figure 1:
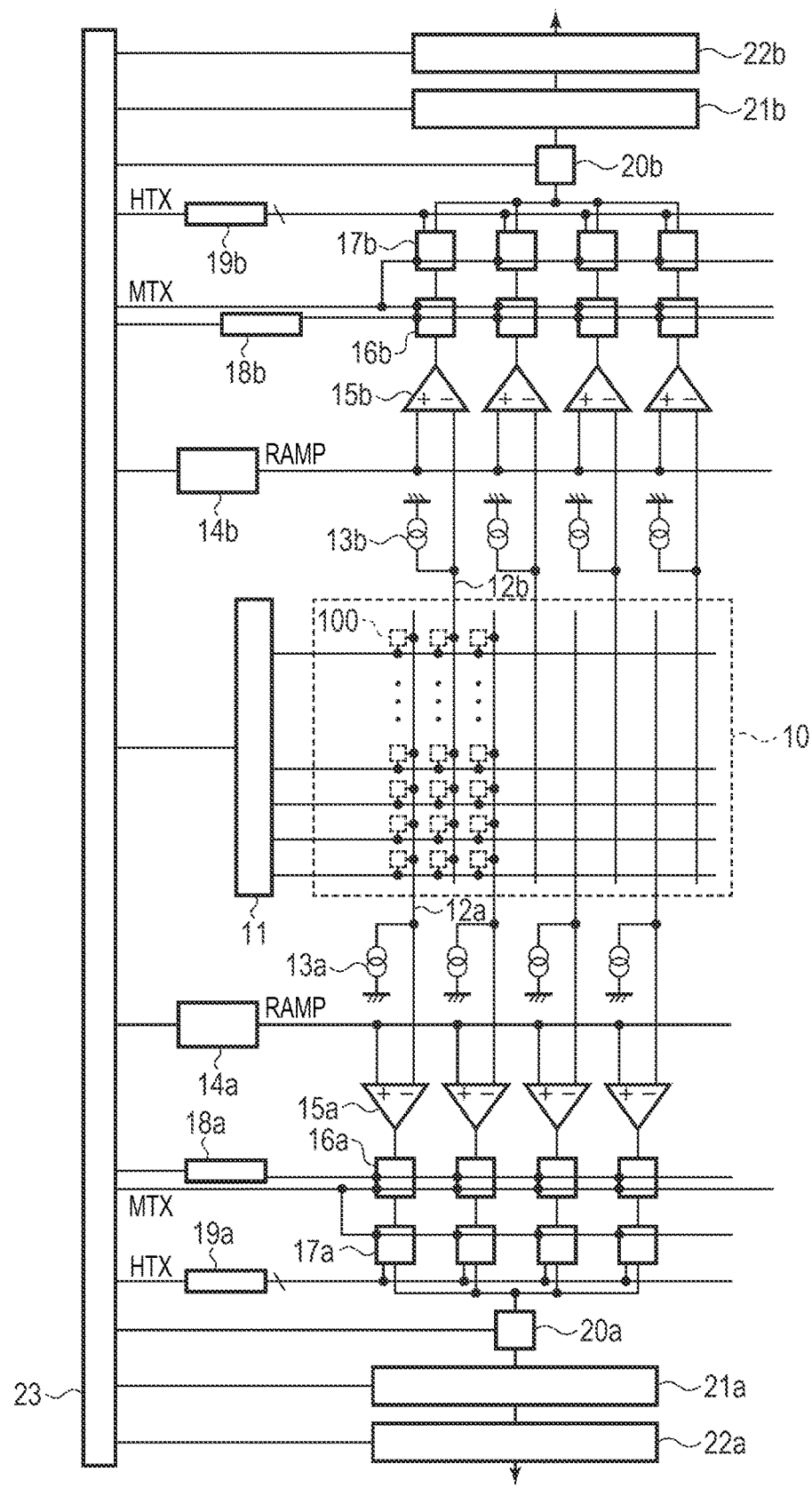
FIG. 1 is a schematic block diagram of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified. In the following embodiments, an imaging device will be mainly described as an example of a photoelectric conversion device. However, the photoelectric conversion device in each embodiment is not limited to the imaging device, and can be applied to other devices. Examples of other devices include a ranging device and a photometric device. The ranging device may be, for example, a focus detection device, a distance measuring device using a time-of-flight (TOF), or the like. The photometric device may be a device that measures an amount of light incident on the device.

First Embodiment

FIG. 1 is a schematic block diagram of a photoelectric conversion device according to the present embodiment. The photoelectric conversion device includes a pixel array 10, a vertical scanning circuit 11, reference signal generation circuits 14a and 14b, counters 18a and 18b, horizontal scanning circuits 19a and 19b, processing circuits 20a and 20b, frame memories 21a and 21b, output circuits 22a and 22b, and a control circuit 23. The various circuits constituting the photoelectric conversion device may be formed in one or a plurality of semiconductor substrates.

The pixel array 10 includes a plurality of pixels 100 arranged in a plurality of rows and a plurality of columns, and each of the pixels 100 outputs a signal corresponding to incident light by photoelectric conversion. Each of the plurality of pixels 100 has a photoelectric conversion unit that generates and accumulates signal charges based on incident light. A microlens and a color filter may be disposed on the pixel 100.

The photoelectric conversion device has column circuits corresponding to the respective columns of the pixel array 10. The column circuit includes a current source 13a, a comparator 15a, a first memory 16a, and a second memory 17a. Alternatively, the column circuit includes a current source 13b, a comparator 15b, a first memory 16b, and a second memory 17b.

The column signal line 12a or 12b is provided for each column of the pixels 100, and the pixels 100 in the same column output signals to the common column signal line 12a or 12b. In this embodiment, the odd-numbered column signal lines 12a and the even-numbered column signal lines 12b may be connected to different circuits. That is, the pixels 100 in the odd-numbered column are read out by the lower circuit in FIG. 1 via the column signal line 12a, and the pixels 100 in even-numbered column are read out by the upper circuit in FIG. 1 via the column signal line 12b. The number of column signal lines arranged in a column of pixels 100 is not limited to one, and may be plural. Although four columns of column circuits are illustrated in FIG. 1, a larger number of column circuits are actually arranged. Typically, the number of columns of column circuits is hundreds to thousands.

As illustrated in FIG. 1, "a" is attached as a suffix to the reference numeral of the lower circuit from which the signals of the column signal lines 12a of the odd-numbered columns are output, and "b" is attached as a suffix to the reference numeral of the upper circuit from which the signals of the column signal lines 12b of the even-numbered columns are output. Since the configuration and function of both circuits are the same, only the elements denoted by "a" will be mainly described below, and the description of the elements denoted by "b" may be omitted.

The control circuit 23 controls the vertical scanning circuit 11, the reference signal generation circuits 14a and 14b, the counters 18a and 18b, the horizontal scanning circuits 19a and 19b, the processing circuits 20a and 20b, the frame memories 21a and 21b, the output circuits 22a and 22b, and the first memories 16a and 16b. The control circuit 23 supplies a control signal or the like indicating the operation timing to each of these units.

The vertical scanning circuit 11 includes a shift register, a gate circuit, a buffer circuit, and the like. The vertical scanning circuit 11 (scanning circuit) outputs a control signal to the pixels 100 based on a vertical synchronization signal, a horizontal synchronization signal, a clock signal, and the like, and performs scanning in which signals are sequentially output from the pixels 100 on a row basis.

The column circuit including the current source 13a, the comparator 15a, the first memory 16a, and the second memory 17a processes a signal output from the pixel 100 via the column signal line 12a. Specifically, the column circuit amplifies the signal in the column signal line 12a and performs analog-to-digital (AD) conversion. The current source 13a is connected to the column signal line 12a and functions as a load circuit supplying a driving current for signal output from the pixel 100. The comparator 15a compares the reference signal with the signal of the column signal line 12a. The first memory 16a and the second memory 17a hold count signals according to the comparison result of the comparator 15a.

The comparator 15a includes a differential amplifier circuit and the like, and has an inverting input node, a non-inverting input node, and an output node. The inverting input node is connected to the column signal line 12a, and the reference signal RAMP is input to the non-inverting input node. The comparator 15a compares the reference signal RAMP with the signal from the pixel 100, and outputs a comparison signal representing the comparison result from the output node.

The reference signal generation circuit 14a generates a reference signal RAMP (ramp signal) whose voltage changes depending on time based on a clock pulse output from the control circuit 23 or a clock generation circuit (not illustrated). The reference signal generation circuit 14a may be configured using various methods such as a capacitor charging/discharging method, a DAC method, and a current steering method. The reference signal RAMP may be an up slope in which the voltage rises with time or a down slope in which the voltage falls with time. The reference signal RAMP may include a plurality of slope waveforms having different voltage change rates per unit time.

The counter 18a counts a clock pulse output from the control circuit 23 or a clock generation circuit (not illustrated), and counts up or down a count signal which is a digital signal having a predetermined number of bits. The control circuit 23 or the clock generation circuit includes an oscillation circuit or the like, and supplies a clock pulse to the counter 18a. The counter 18a starts counting the clock pulse simultaneously with the start of the voltage change of the reference signal RAMP of the reference signal generation circuit 14a, and outputs the clock signal to the first memory 16a via the wiring.

The comparison signal from the comparator 15a and the count value from the counter 18a are input to the first memory 16a. The first memory 16a latches the count signal at the timing when the comparison result is inverted. The count signal held in the first memory 16a represents a digital value obtained by analog-to-digital conversion of an analog signal. When a pulse of the control signal MTX is input from the control circuit 23 to the first memory 16a and the second memory 17a, the count value held in the first memory 16a is transferred to the second memory 17a. The second memory 17a can hold the count value transferred from the first memory 16a. Each of the first memory 16a and the second memory 17a may hold a count signal at the time of resetting the pixel 100 and a count signal based on photoelectric conversion of the pixel 100.

The horizontal scanning circuit 19a includes a shift register, a gate circuit, a buffer circuit, and the like. The horizontal scanning circuit 19a sequentially outputs control signals to the second memories 17a of the corresponding columns via wirings corresponding to the respective columns based on the pulses of the control signal HTX supplied from the control circuit 23. Thus, the count value held in the second memory 17a is sequentially transferred to the processing circuit 20a on a column basis. The pulse of the control signal HTX is a signal indicating the start timing of horizontal transfer of a signal from the second memory 17a to the processing circuit 20a.

The processing circuit 20a includes a digital signal processor and a line memory, and has a function of performing processing such as digital correlated double sampling. The processing circuit 20a performs predetermined signal processing on the input count value and stores it in the frame memory 21a. The specific content of the signal processing will be described later. The line memory in the processing circuit 20a is used to temporarily store a signal for digital correlated double sampling. The signal held in the frame memory 21a is output to the outside of the photoelectric conversion device by a method such as low voltage differential signaling (LVDS) via the output circuit 22a under the control of the control circuit 23.

As described above, the first memory 16a and the second memory 17a have a function of holding AD conversion results for one pixel. On the other hand, the frame memory 21a has a data capacity capable of collectively holding AD conversion results of signals output from all the pixels 100 in the odd-numbered columns of the pixels 100 included in the pixel array 10. Further, the frame memory 21b has a data capacity capable of collectively holding AD conversion results of signals output from all the pixels 100 in the even-numbered columns of the pixels 100 included in the pixel array 10. That is, the sum of the data capacity of the frame memory 21a and the data capacity of the frame memory 21b is the data capacity of one frame. The frame memories 21a and 21b may have a data capacity for a plurality of frames.

Although FIG. 1 illustrates an example in which a count signal is input from the counter 18a common to the plurality of first memories 16a, the circuit configuration is not limited to this. For example, a plurality of counters 18a may be arranged to correspond to the plurality of first memories 16a, respectively. In this case, a common clock pulse is input to the plurality of counters 18a, and each of the plurality of counters 18a generates a count signal based on the common clock pulse.

Figure 2:
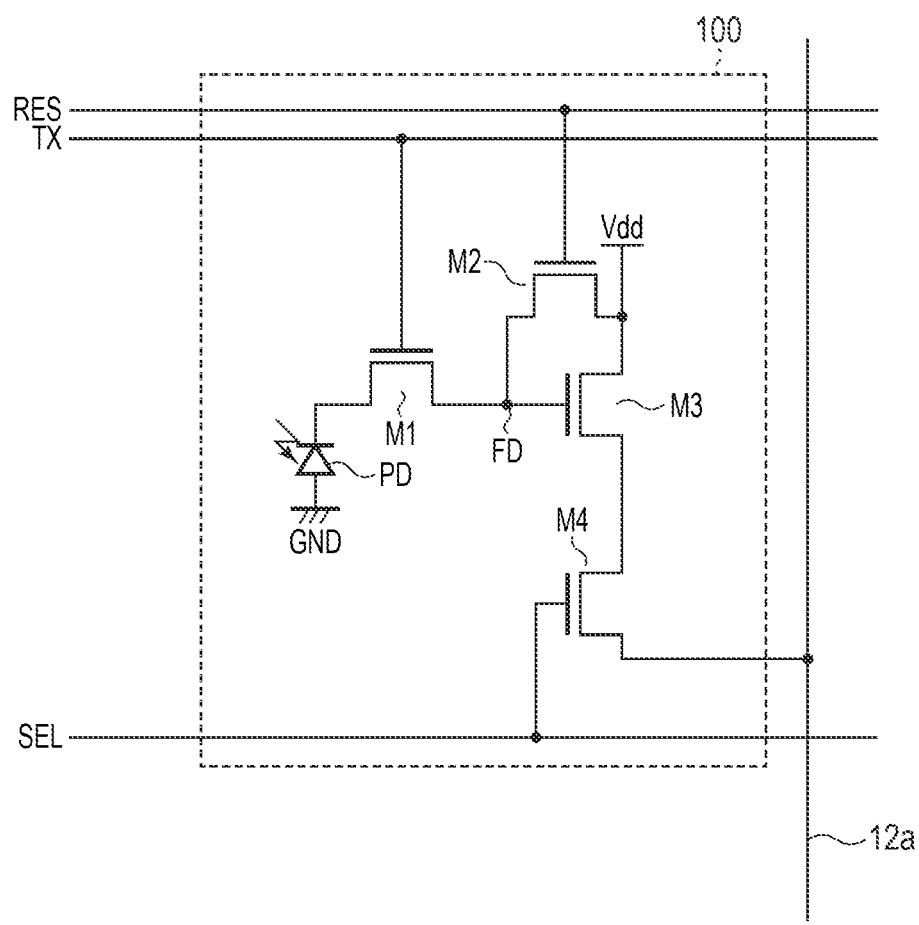
FIG. 2 is a circuit diagram of a pixel according to the first embodiment.

FIG. 2 is a circuit diagram of the pixel 100 according to the present embodiment. The pixel 100 may include a photoelectric conversion unit PD, a transfer transistor M1, a floating diffusion FD, a reset transistor M2, a source follower transistor M3, and a select transistor M4. In the following description, unless otherwise specified, these transistors are configured by N-type metal oxide semiconductor (MOS) transistors. A reference voltage (for example, ground voltage GND) is supplied to back gate nodes (not illustrated) of these transistors. The drain nodes of the reset transistor M2 and the source follower transistor M3 are connected to the power supply voltage Vdd. A P-type MOS transistor may be used instead of the N-type MOS transistor. In this case, the voltage of the control signal applied to the gate node of the P-type MOS transistor is inverted with respect to the voltage of the control signal applied to the gate node of the N-type MOS transistor.

The photoelectric conversion unit PD is, for example, a photodiode, and generates charges by photoelectric conversion of incident light and accumulates the generated charges. Instead of the photodiode, a photoelectric conversion film of an organic material, a photogate, or the like may be used to generate a photoelectric effect. The photoelectric conversion unit PD is provided with a microlens, and light condensed by the microlens enters the photoelectric conversion unit PD. The number of photoelectric conversion units PD included in one pixel 100 is not limited. For example, two, four, or more photoelectric conversion units PD may be provided to share one microlens. Thus, a signal for distance measurement used for autofocus by the phase difference detection method or the like can be acquired. Further, dark current noise can be reduced by adopting a buried photodiode for the photoelectric conversion unit PD.

The transfer transistor M1 is provided corresponding to the photoelectric conversion unit PD, and a control signal TX is supplied to the gate node of the transfer transistor M1. When the control signal TX becomes the high level, charges generated by light reception and accumulated in the photoelectric conversion unit PD are transferred to the floating diffusion FD via the transfer transistor M1.

A power supply voltage Vdd is applied to the drain node of the source follower transistor M3. The source potential of the source follower transistor M3 changes according to the amount of charge transferred to the floating diffusion FD.

The select transistor M4 is provided between the source follower transistor M3 and the column signal line 12a. The select transistors M4 of the pixels 100 in a plurality of rows in the same column are connected to a common column signal line 12a. The current source 13a and the source follower transistor M3 constitute a source follower. A control signal SEL is supplied to the gate node of the select transistor M4. When the control signal SEL becomes the high level, the select transistor M4 outputs a signal corresponding to the source potential of the source follower transistor M3 to the column signal line 12a.

The source node of the reset transistor M2 is connected to the floating diffusion FD, and the power supply voltage Vdd is applied to the drain node of the reset transistor M2. A control signal RES is supplied to the gate node of the reset transistor M2. When the control signal RES becomes the high level, the reset transistor M2 resets the potential of the floating diffusion FD.

Figure 3:
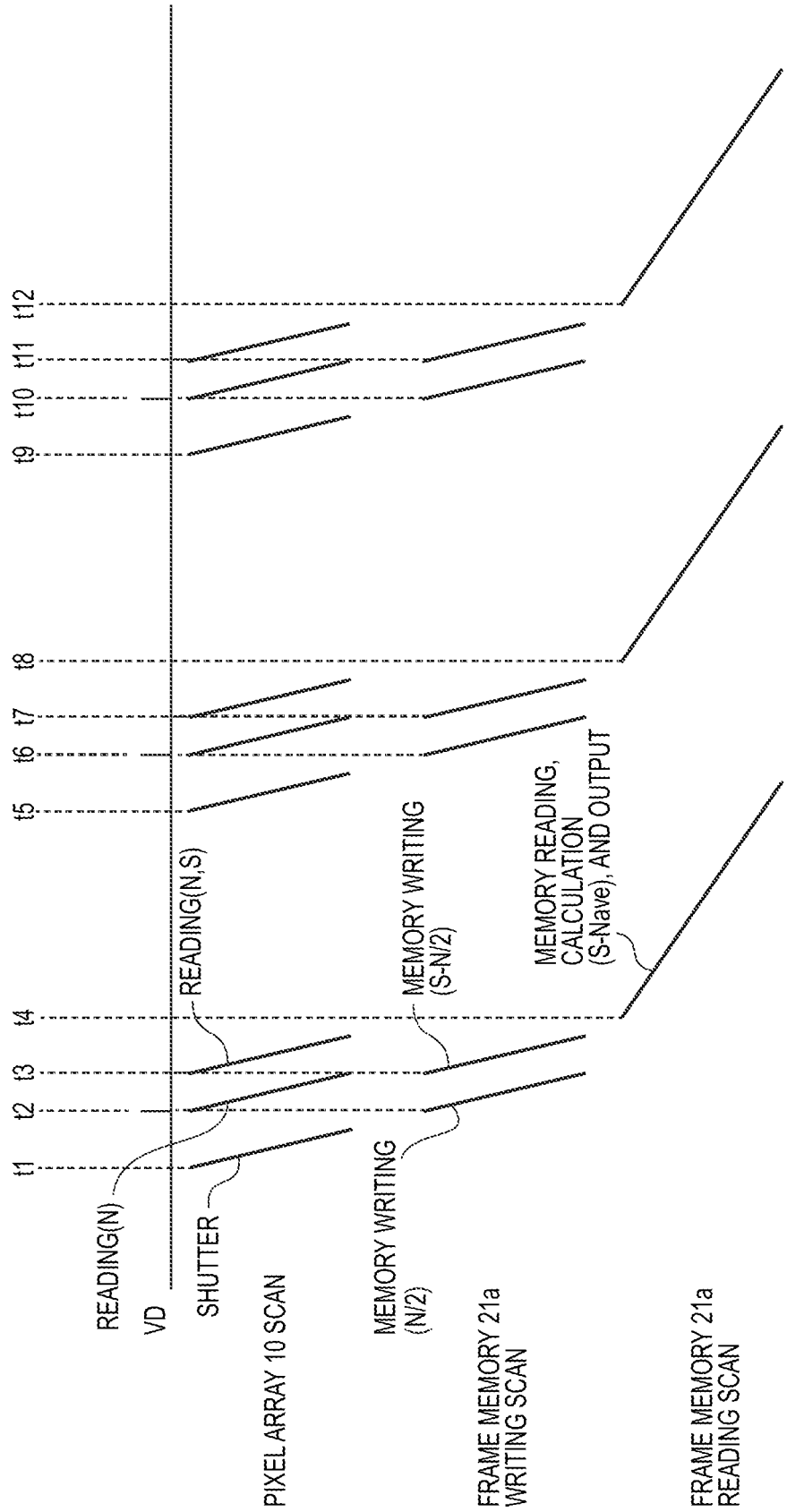
FIG. 3 is a timing chart illustrating a scanning method of the photoelectric conversion device according to the first embodiment.

FIG. 3 is a timing chart illustrating a scanning method of the photoelectric conversion device according to the present embodiment. FIG. 3 schematically illustrates the timing of the control signal VD for starting the row sequential reading of the pixel array 10, the scan of the pixel array 10, the writing scan of the frame memory 21a, and the reading scan of the frame memory 21a. The horizontal direction of FIG. 3 indicates the passage of time. The vertical direction of each of "pixel array 10 scan", "frame memory 21a writing scan", and "frame memory 21a reading scan" indicates a row of the corresponding pixel array 10. Oblique lines indicating each of these scans indicates the relationship between the time and the row on which reading, writing, and the like are performed in the scans. As illustrated in FIG. 3, in each scan, the processing of the first row is performed first, and then the processing of the second row is performed, so that the processing is sequentially performed on a row basis over time. Such scan may be referred to as a row sequential scan. The time at which the pulse of the control signal VD in FIG. 3 rises corresponds to the time at which the vertical scanning circuit 11 starts outputting the control signal for the reading scan and the reading of the first row of the pixel array 10 is started.

At time t1, the shutter scan in the pixel array 10 starts. Thus, in the pixel array 10, the shutter operation is sequentially performed from the pixels 100 in the first row. The shutter operation is a process in which the photoelectric conversion unit PD is reset by turning on the transfer transistor M1 and the reset transistor M2 in the pixel 100, and then the reset of the photoelectric conversion unit PD is released. After the reset of the photoelectric conversion unit PD is released, the photoelectric conversion unit PD starts to generate and accumulate charges in response to the incident light.

At time t2, the pulse of the control signal VD rises, and the reading scan (first scan) of the reset signal in the pixel array 10 is started. Thus, in the pixel array 10, the reset signal (first reset signal) is sequentially output from the pixels 100 in the first row. The reset signal is an output signal when the reset transistor M2 is on and the potential of the floating diffusion FD of the pixel 100 is reset (reset state). This reset signal may be referred to as a signal N.

At the time t2, in parallel with the reading scan, the writing scan of the read signal into the frame memory 21a is started. In this process, the reset signal read out from the pixel array 10 is subjected to AD conversion. The processing circuit 20a performs a right bit shift on the digital value of the reset signal after AD conversion to multiply the value by ½. The reset signal converted to ½ times in this way may be referred to as a signal N/2. The signal N/2 is written into the frame memory 21a.

When the reading scan of the pixel array 10 and the writing scan of the frame memory 21a end up to the last row at time t3, the reading scan (second scan) of the pixel array 10 and the writing scan of the frame memory 21a start again from the first row. In the scans from the time t3, the reset signal (second reset signal) and the optical signal are sequentially output from the pixels 100 in the first row in the pixel array 10. The reset signal is the same as described above, and is an output signal when the potential of the floating diffusion FD is reset. The optical signal is an output signal based on the potential of the floating diffusion FD after the charges accumulated in the photoelectric conversion unit PD is transferred to the floating diffusion FD by turning on the transfer transistor M1. This optical signal may be referred to as a signal S.

At the time t3, in parallel with the reading scan of the pixel array 10, the writing scan of the read signal into the frame memory 21a is started. In this process, the reset signal and the optical signal read out from the pixel array 10 are subjected to AD conversion. The processing circuit 20a performs the right bit shift on the digital value of the reset signal after AD conversion to multiply the value by ½. The reset signal converted to ½ times in this way may be referred to as a signal N/2. Further, the processing circuit 20a performs a process of subtracting the reset signal converted to ½ times (signal N/2) from the optical signal (signal S). The signal obtained by this process may be referred to as a signal S–N/2. The signal S–N/2 is written into the frame memory 21a.

At time t4 after completion of the scan from the time t3, the reading scan of the frame memory 21a is started. In the scan from the time t4, the signal N/2 obtained by the scan from the time t2 and the signal S–N/2 obtained by the scan from the time t3 are sequentially read out from the frame memory 21a to calculate those signals, and output the calculated signal from the output circuit 22a on a row basis. This calculation process may be a process of subtracting the signal N/2 from the signal S–N/2. Thus, a signal indicating the result of subtracting the two signals N/2 from the signal S is obtained. This process corresponds to a process of subtracting the average of two signals N from the signal S. The average of the two signals N may be referred to as a signal Nave, and a signal obtained by subtracting the signal N/2 from the signal S–N/2 may be referred to as a signal S-Nave.

At times t5 to t8 and times t9 to t12, the same scans as at the times t1 to t4 are performed. Although not illustrated, the same scans can be repeated even after the time t12.

Figure 4:
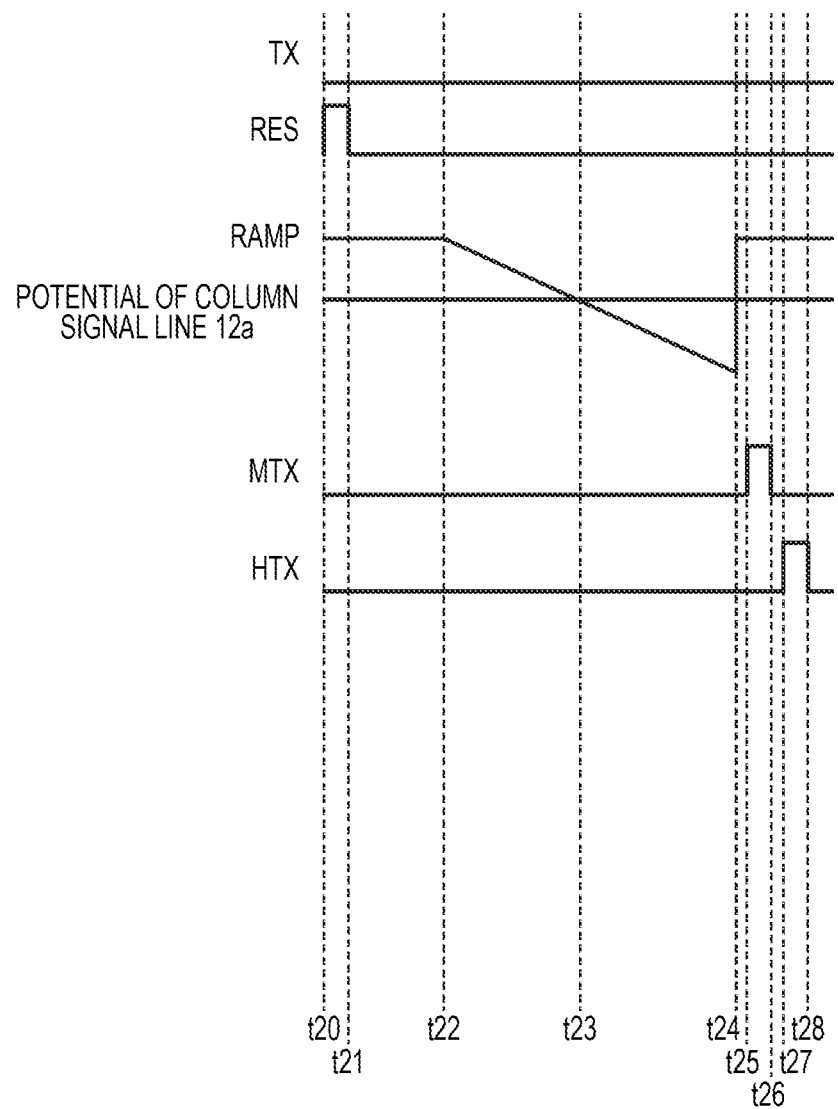
FIG. 4 is a timing chart illustrating a readout method for one row of the photoelectric conversion device according to the first embodiment.
Figure 5:
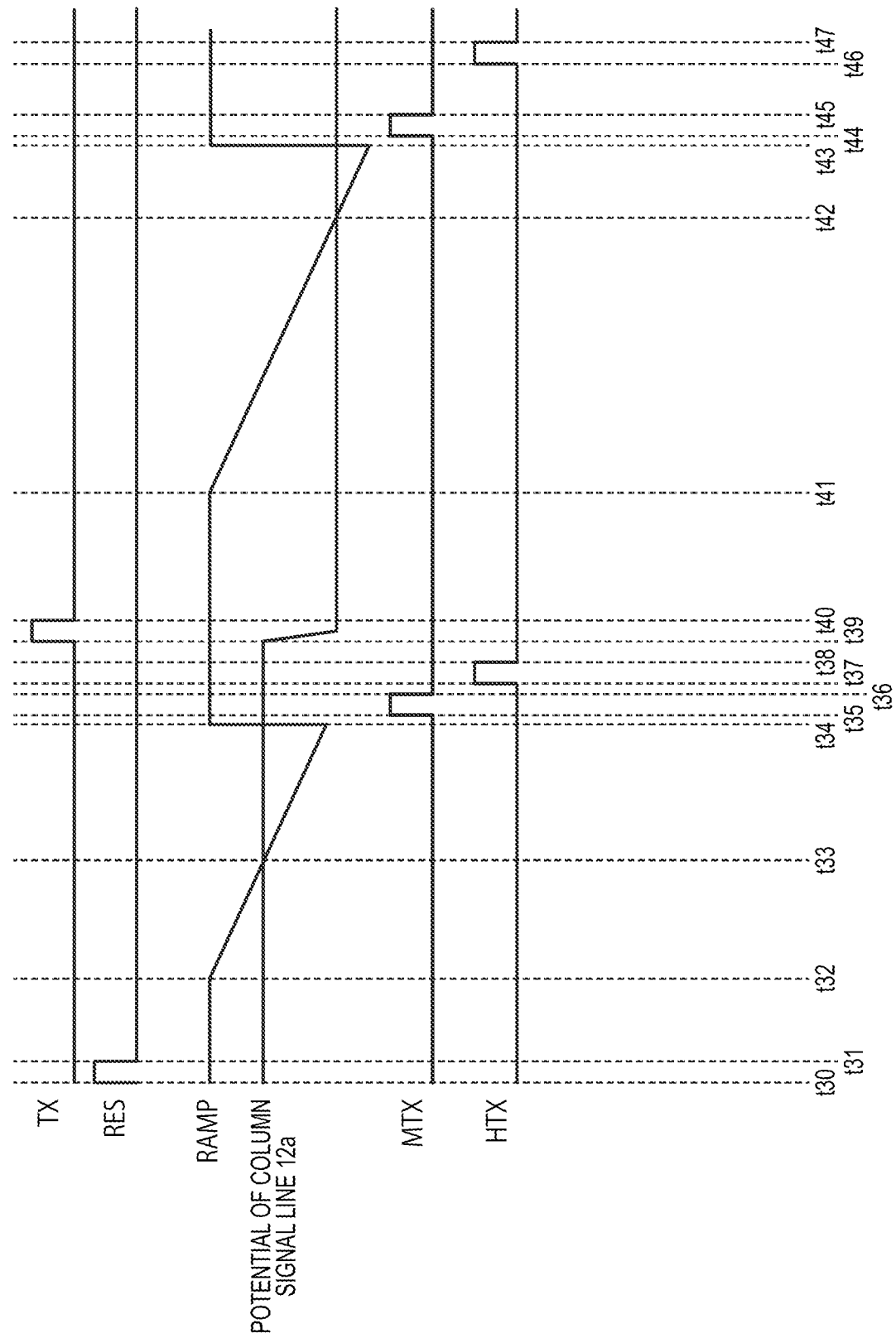
FIG. 5 is a timing chart illustrating a readout method for one row of the photoelectric conversion device according to the first embodiment.

FIGS. 4 and 5 are timing charts illustrating a readout method for one row of the photoelectric conversion device according to the present embodiment. FIG. 4 illustrates processing for one row of the reading scan of the signal N and the writing scan of the signal N/2 into the frame memory 21a in the pixel array 10 started from the time t2. FIG. 5 illustrates processing for one row of the reading scan of the signal N and the signal S and writing scan of the signal S–N/2 to the frame memory 21a in the pixel array 10 started at the time t3. FIGS. 4 and 5 illustrate the potential levels of the control signals TX, RES, MTX, and HTX, the potential of the reference signal RAMP, and the potential of the column signal line 12a.

First, referring to FIG. 4, an operation of reading the signal N from the pixels 100 in one row and writing the signal N/2 into the frame memory 21a will be described. At time t20, the control signal RES becomes the high level. Thereafter, at time t21, the control signal RES becomes the low level. By these operations, the reset transistor M2 is temporarily turned on, and the potential of the floating diffusion FD is reset. Accordingly, the potential of the column signal line 12a becomes the reset level.

At time t22, the potential of the reference signal RAMP output from the reference signal generation circuit 14a starts to change. At the same time, the count signal output from the counter 18a starts to change.

At time t23, when the magnitude relation between the potential of the reference signal RAMP input to the comparator 15a and the potential of the column signal line 12a is inverted, the first memory 16a holds the count signal at that time point. Thus, the first memory 16a acquires the digital signal corresponding to the time from the time t22 to the time t23. In this way, AD conversion of the reset signal is performed. Thereafter, at time t24, the potential of the reference signal RAMP output from the reference signal generation circuit 14a is reset.

At time t25, the control signal MTX becomes the high level. Thereafter, at time t26, the control signal MTX becomes the low level. In response to the pulse of the control signal MTX, the reset signal held in the first memory 16a is transferred to the second memory 17a.

At time t27, the control signal HTX becomes the high level. Thereafter, at time t28, the control signal HTX becomes the low level. In response to the pulse of the control signal HTX, the horizontal scanning circuit 19a starts horizontal transfer in which the reset signals held in the second memory 17a are sequentially transferred to the processing circuit 20a on a column basis. As described above, the processing circuit 20a performs the right bit shift on the reset signal sequentially transferred from the second memory 17a on a column basis, multiplies the value by ½, and transfers the resultant signal to the frame memory 21a. In this manner, the signal N/2 is written into the frame memory 21a.

Next, referring to FIG. 5, the operation of reading the signal N and the signal S from the pixels 100 in one row and writing the signal S–N/2 into the frame memory 21a will be described. From time t30 to time t38, the signal N is read from the pixel 100 and the signal N/2 is generated by the same operation as that from the time t20 to the time t28 in FIG. 4. However, the generated signal N/2 is not transferred to the frame memory 21a, but is temporarily held in the line memory in the processing circuit 20a.

At time t39, the control signal TX becomes the high level. Thereafter, at time t40, the control signal TX becomes the low level. By these operations, the transfer transistor M1 is temporarily turned on, the charges accumulated in the photoelectric conversion unit PD is transferred to the floating diffusion FD, and the potential of the floating diffusion FD decreases in accordance with the amount of transferred charge. Accordingly, the potential of the column signal line 12a becomes a level corresponding to the charges accumulated in the photoelectric conversion unit PD.

At time t41, the potential of the reference signal RAMP output from the reference signal generation circuit 14a starts to change. At the same time, the count signal output from the counter 18a starts to change.

At time t42, when the magnitude relation between the potential of the reference signal RAMP input to the comparator 15a and the potential of the column signal line 12a is inverted, the first memory 16a holds the count signal at that time point. Thus, the first memory 16a acquires the digital signal corresponding to the time from the time t41 to the time t42. Thus, the AD conversion of the optical signal is performed. Thereafter, at time t43, the potential of the reference signal RAMP output from the reference signal generation circuit 14a is reset.

At time t44, the control signal MTX becomes the high level. Thereafter, at time t45, the control signal MTX becomes the low level. In response to the pulse of the control signal MTX, the optical signal held in the first memory 16a is transferred to the second memory 17a.

At time t46, the control signal HTX becomes the high level. Thereafter, at time t47, the control signal HTX becomes the low level. In response to the pulse of the control signal HTX, the horizontal scanning circuit 19a starts horizontal transfer in which the optical signals held in the second memory 17a are sequentially transferred to the processing circuit 20a on a column basis. As described above, the processing circuit 20a sequentially subtracts the signal N/2 held in the line memory in the processing circuit 20a from the optical signal transferred from the second memory 17a on a column basis, and then transfers the resultant signal N/2 to the frame memory 21a. In this way, the signal S–N/2 is written into the frame memory 21a.

As described above, in the present embodiment, two row sequential scans are performed for an image of one frame or for one pulse of the control signal VD in FIG. 3. Two reset signals and one optical signal used for correlated double sampling are acquired by the two row sequential scans. Thus, since two reset signals can be used for the correlated double sampling, noise is further reduced as compared with the case where only one reset signal is used for the correlated double sampling.

In the present embodiment, one reset signal is acquired by a row sequential scan different from another row sequential scan for acquiring an optical signal. Thus, compared to the case where two reset signals are collectively acquired in the same row sequential scan as a row sequential scan in which the optical signal is acquired, the readout time for one row in the row sequential scan in which the optical signal is acquired can be shortened, and the dynamic resolution is improved. Therefore, according to the present embodiment, a photoelectric conversion device capable of improving dynamic resolution is provided. For example, when the photoelectric conversion device is an imaging device that captures an image, an effect of reducing object blur can be obtained by improving dynamic resolution.

Although not essential, in the present embodiment, one reset signal is acquired in the same row sequential scan as the row sequential scan in which the optical signal is acquired. Accordingly, since one reset signal and the optical signal are acquired at time points close to each other, the influence of low-frequency power supply noise or the like can be reduced.

Figure 6:
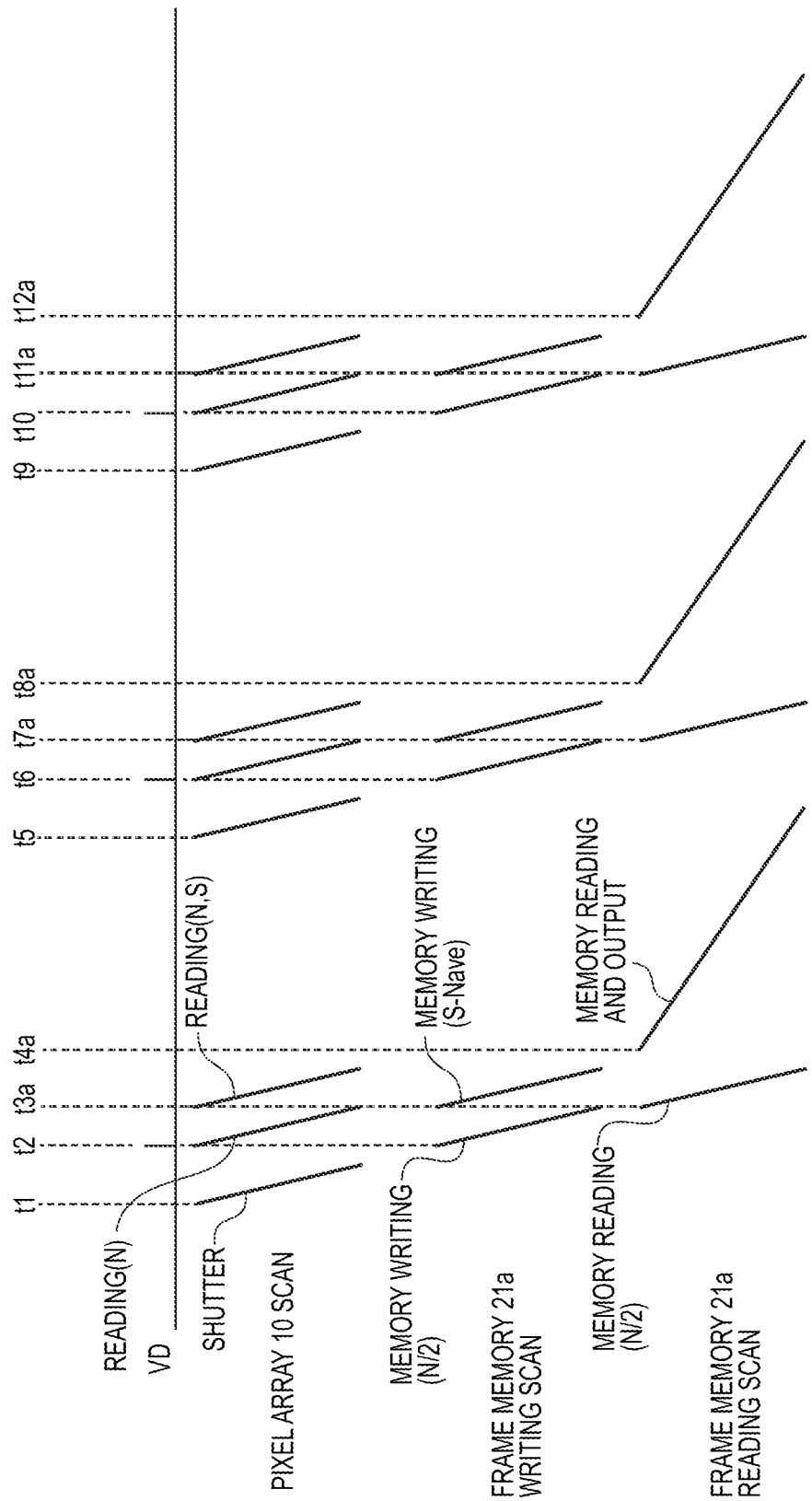
FIG. 6 is a timing chart illustrating an outline of a scanning method of the photoelectric conversion device according to a modified example of the first embodiment.

Note that the driving method of the photoelectric conversion device described above is an example, and the present invention is not limited thereto. Hereinafter, a modified example of the driving method will be described with reference to FIG. 6. FIG. 6 is a timing chart illustrating a scanning method of the photoelectric conversion device according to the modified example of the present embodiment. In the description of FIG. 6, the description of portions common to those of FIG. 3 may be omitted or simplified.

In FIG. 6, the shutter scan from the time t1 and the read scan and write scan of the reset signal from the time t2 are the same as those in FIG. 3, and therefore description thereof will be omitted. That is, the signal N/2 is written into the frame memory 21a in the same manner as in the driving method of FIG. 3.

When the reading scan of the pixel array 10 and the writing scan of the frame memory 21a end up to the last row at time t3a, the reading scan of the pixel array 10 starts again from the first row. In the readout scan from time t3a, the reset signal and the optical signal are sequentially output from the pixels 100 in the first row in the pixel array 10 in the same manner as in the driving method of FIG. 3.

At the time t3a, the reading scan of the frame memory 21a and the writing scan of the calculated signal into the frame memory 21a start in parallel with the reading scan of the pixel array 10. In this process, the reset signal and the optical signal read out from the pixel array 10 are subjected to AD conversion. The processing circuit 20a performs the right bit shift on the digital value of the reset signal after AD conversion to generate the signal N/2, and subtract the signal N/2 from the optical signal (S signal). Thereby, the signal S–N/2 is generated. Then, the processing circuit 20a reads the signal N/2 acquired by the scan from time t2 from the frame memory 21a, and further performs a process of subtracting the signal N/2 from the signal S–N/2. Thus, the signal S-Nave is generated. The generated corrected signal S-Nave is written into the frame memory 21a.

At time t4a, the reading scan of the frame memory 21a is started. In the scan from the time t4a, the signal S-Nave is sequentially output from the frame memory 21a from the output circuit 22a on a row basis.

At times t5 to t8a and times t9 to t12a, the same scans as at the times t1 to t4a are performed. Although not illustrated, the same scans can be repeated even after the time t12a.

In the driving method of FIG. 3, since the signal N/2 and the signal S–N/2 are stored in the frame memory 21a at the same time, the frame memory 21a requires data capacity for two frames. On the other hand, in the driving method of FIG.

6, since the data capacity of the frame memory 21a is only one frame, the data capacity of the frame memory 21a is reduced.

On the other hand, in the driving method of FIG. 6, since reading of the frame memory 21a is added in scanning from time t3a, power consumption during operation is increased compared to the driving method of FIG. 3. In addition, interference noise caused by reading of the frame memory 21a may occur. Therefore, the driving method of FIG. 3 is more preferable in terms of power consumption and noise reduction than the driving method of FIG. 6. As described above, there are advantages and disadvantages between the driving method of FIG. 3 and the driving method of FIG. 6. These can be appropriately selected in consideration of design requirements and the like.

Note that the above-described method of calculating the signal S-Nave is an example. The signal N may be written into the frame memory 21a without performing the right bit shift in the row sequential scan from the time t2, and the signal N may be averaged with the signal N acquired in the row sequential scan from the time t3 (or the time t3a) to generate the signal Nave. In this case, by subtracting the signal Nave from the signal S, the signal S-Nave can be acquired as in the driving method of FIG. 3 or 6.

Second Embodiment

A photoelectric conversion device according to a second embodiment will be described. In the description of the present embodiment, portions having the same functions as those of the first embodiment are denoted by the same reference numerals, and detailed description thereof may be omitted or simplified.

In the first embodiment, two reset signals are acquired by two row sequential scans, but in the photoelectric conversion device of the present embodiment, four reset signals are acquired by two row sequential scans. A difference from the first embodiment is that the process of FIG. 4 is replaced with the process of FIG. 7 described later. Since the other points are substantially the same as those of the first embodiment, description thereof will be omitted.

Figure 7:
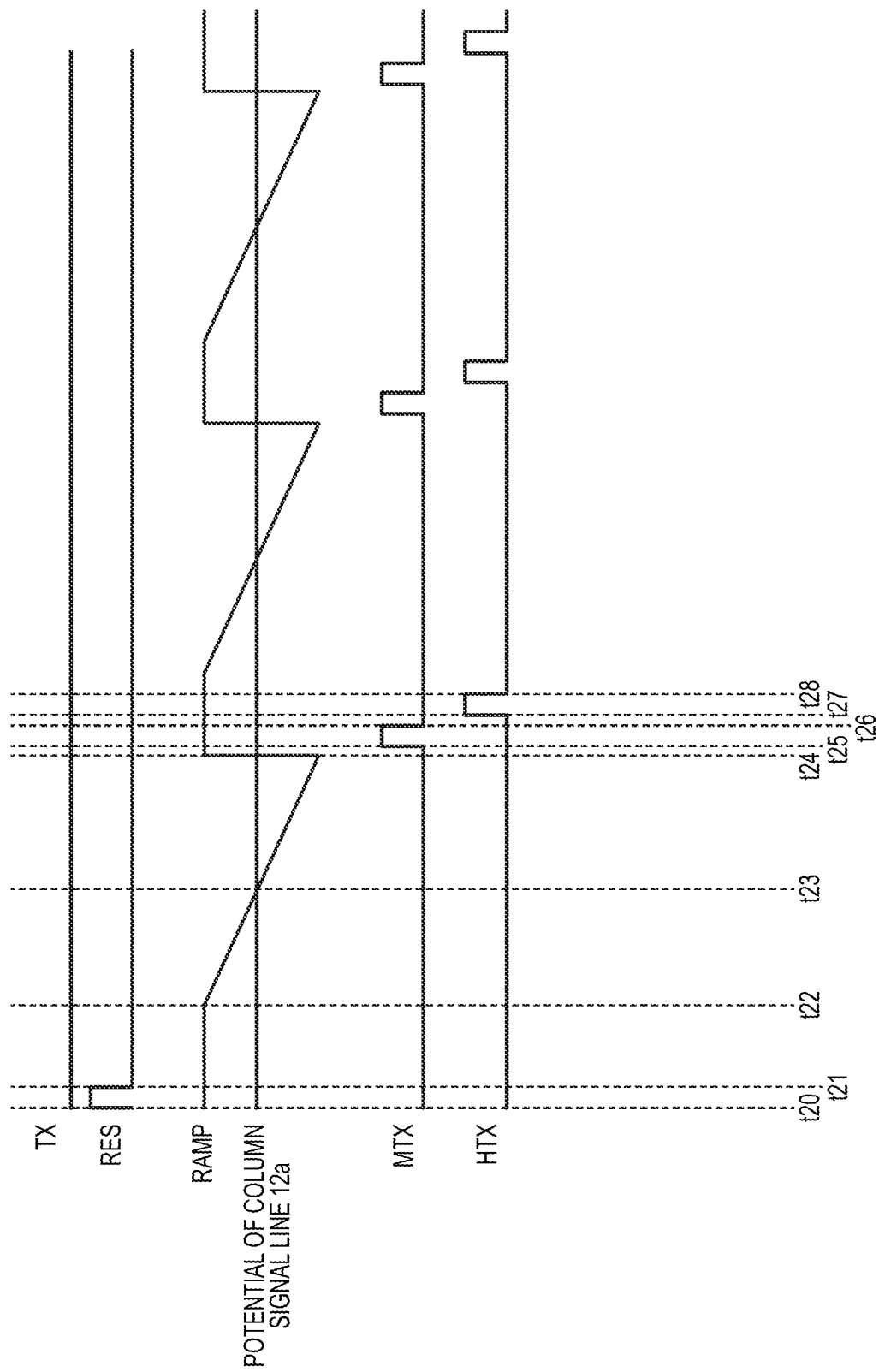
FIG. 7 is a timing chart illustrating a readout method for one row of the photoelectric conversion device according to a second embodiment.

FIG. 7 is a timing chart illustrating a readout method for one row of the photoelectric conversion device according to the present embodiment. The operation from time t20 to time t28 illustrated in FIG. 7 is the same as the operation from the time t20 to the time t28 illustrated in FIG. 4. After the time t28, the same operation is repeated twice further, and a total of three reset signals are read out.

In the present embodiment, the processing circuit 20a performs the right bit shift by two bits on the reset signal sequentially transferred from the second memory 17a on a column basis, thereby multiplying the value by ¼. The reset signal converted to ¼ times in this way may be referred to as a signal N/4. Then, the processing circuit 20a adds the three signals N/4 and transfers the resultant signal to the frame memory 21a. A signal obtained by adding three signals N/4 in this way may be referred to as a signal 3N/4. In order to realize this processing, the processing circuit 20a may include a line memory for temporarily storing three signals N/4.

The process at the time t3 in FIG. 3 is generally performed in the same manner as in the first embodiment, but differs from the first embodiment in that the amount of right bit shift on the reset signal is two bits. That is, the processing circuit 20a performs a process of subtracting the reset signal converted by ¼ times (signal N/4) from the optical signal (signal S). The signal obtained by this process may be referred to as a signal S-N/4. The signal S-N/4 is written into the frame memory 21a. In the scan from the time t4 in FIG. 3, the signal S-Nave is generated and output by subtracting the signal 3N/4 from the signal S-N/4.

In the present embodiment, four reset signals and one optical signal used for correlated double sampling are acquired by two row sequential scans. Thus, since the four reset signals can be used for the correlated double sampling, noise is further reduced as compared with the case where only two reset signals are used as in the first embodiment. Therefore, in the present embodiment, in addition to the effect similar to that of the first embodiment, a photoelectric conversion device capable of further reducing noise is provided.

The example of using two reset signals in the first embodiment and the example of using four reset signals in the second embodiment are exemplified. The number of reset signals may be plural, and may be changed as appropriate in accordance with a required noise level or the like. When the number of reset signals used for correlated double sampling is n, the same processing can be realized by subtracting 1/n times of each reset signal from the optical signal. However, since division processing of digital values can be easily performed by the right bit shift, n is preferably a power of two.

Third Embodiment

A photoelectric conversion device according to a third embodiment will be described. In the description of the present embodiment, portions having the same functions as those of the first embodiment or the second embodiment are denoted by the same reference numerals, and detailed description thereof may be omitted or simplified.

In the first embodiment, one reset signal is acquired by the first row sequential scan, and one reset signal and one optical signal are acquired by the second row sequential scan. In contrast, in the photoelectric conversion device of the present embodiment, two reset signals (the first reset signal and the second reset signal) are acquired by the first row sequential scan, and one optical signal is acquired by the second row sequential scan. In the present embodiment, the processes of FIGS. 4 and 5 of the first embodiment are replaced by the processes of FIGS. 8 and 9, which will be described later. Since the other points are substantially the same as those of the first embodiment, description thereof will be omitted.

Figure 8:
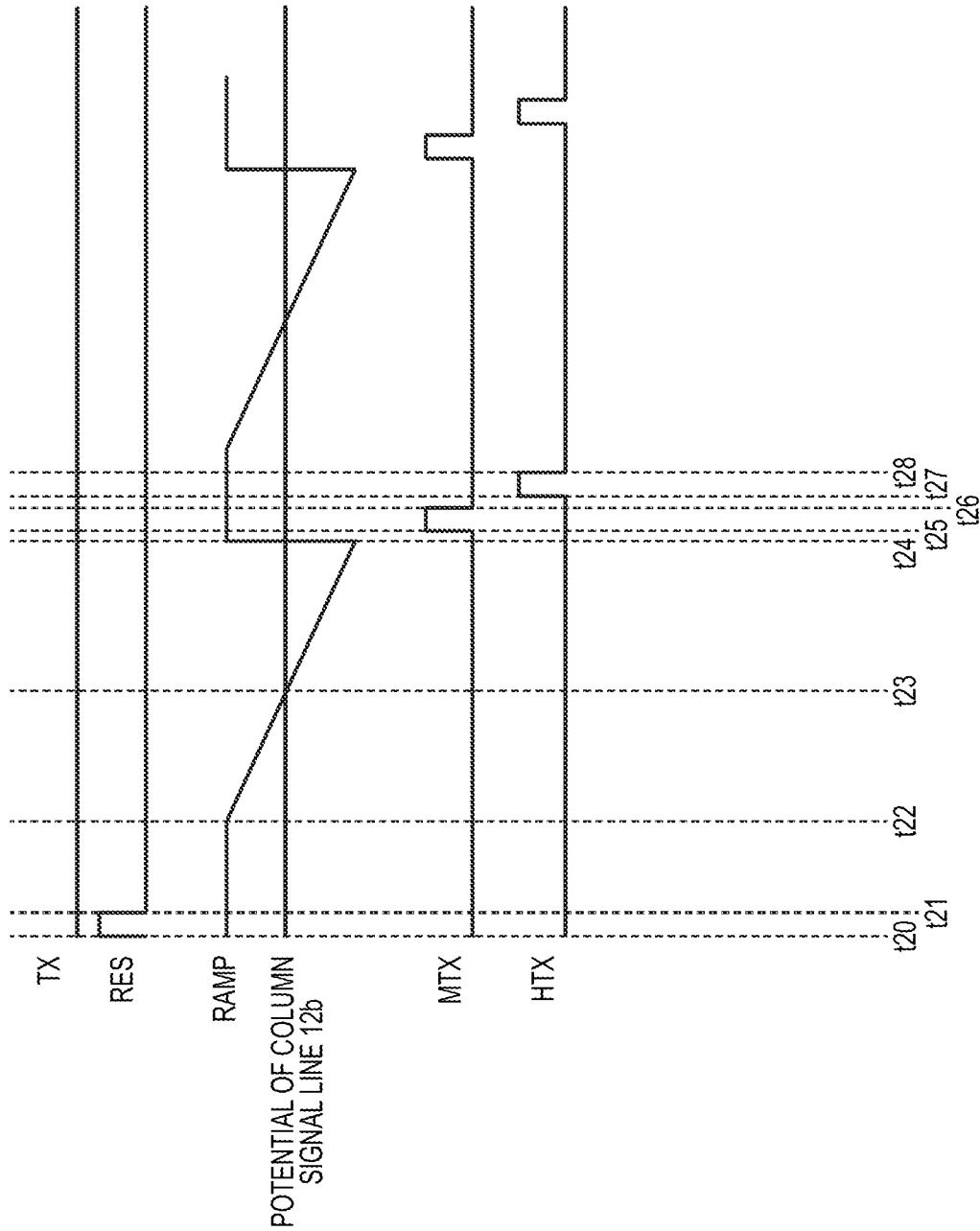
FIG. 8 is a timing chart illustrating a readout method for one row of the photoelectric conversion device according to a third embodiment.
Figure 9:
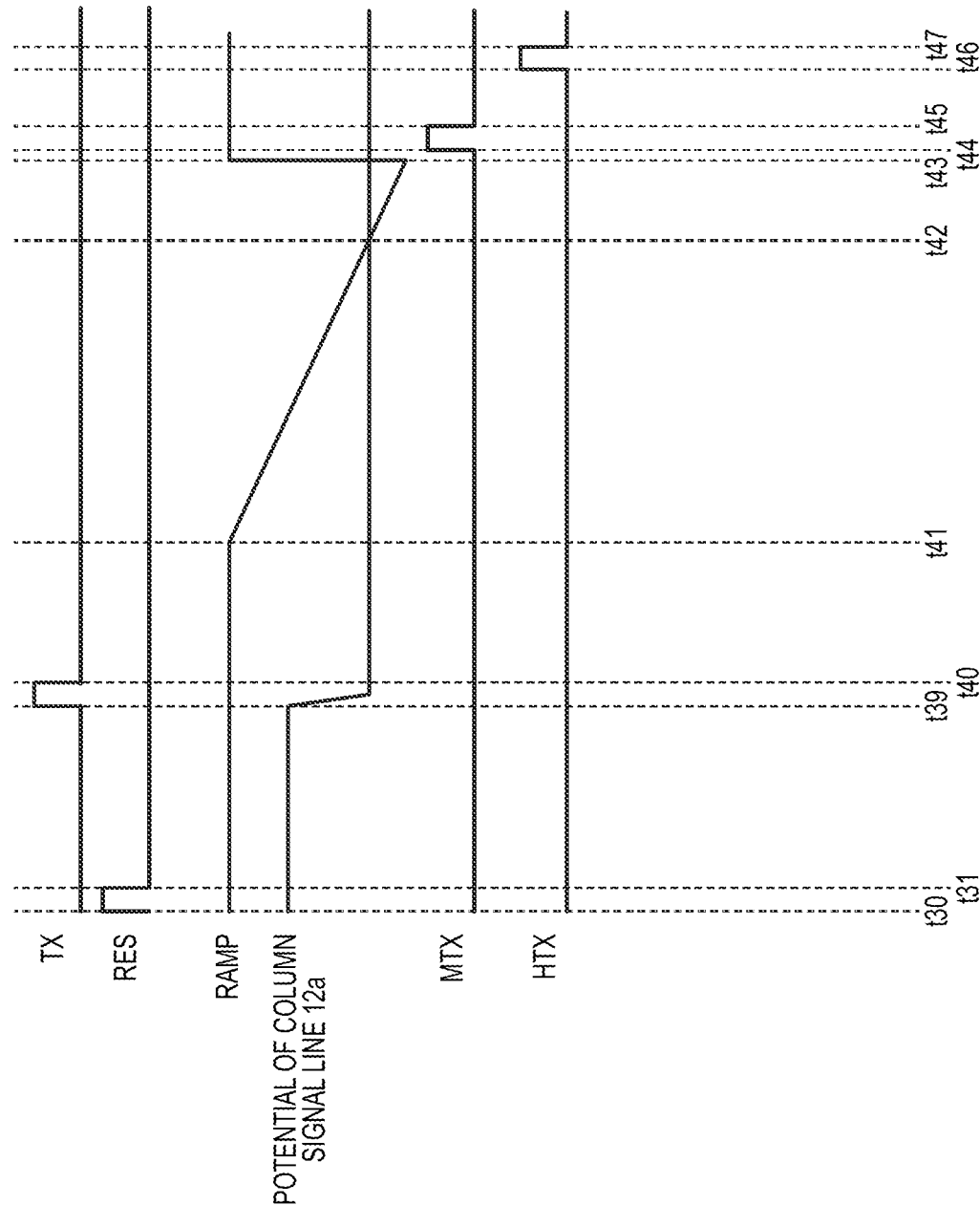
FIG. 9 is a timing chart illustrating a readout method for one row of the photoelectric conversion device according to the third embodiment.

FIGS. 8 and 9 are timing charts illustrating a readout method for one row of the photoelectric conversion device according to the present embodiment. The operation from time t20 to time t28 illustrated in FIG. 8 is the same as the operation from the time t20 to the time t28 illustrated in FIG. 4. After the time t28, the same operation is repeated one more time, and a total of two reset signals are read out.

The operations at times t30, t31, and t39 to t47 illustrated in FIG. 9 are the same as the operations at times illustrated by the same reference numerals in FIG. 5. In FIG. 9, the operation from time t32 to time t38 in FIG. 5 is omitted. That is, in the operation of FIG. 9, reading of the reset signal is omitted from the operation of FIG. 5, and only the optical signal is read.

Also in the reading method of the present embodiment, the signal S-Nave can be acquired by the right bit shift on the two reset signals to generate two signals N/2 and subtracting them from the signal S. Therefore, as in the first embodiment, correlated double sampling using two reset signals can be performed, and noise is reduced.

Also in the present embodiment, as in the first embodiment, reset signals are acquired by a row sequential scan different from another row sequential scan for acquiring optical signals. Thus, compared to the case where two reset signals are collectively acquired in the same row sequential scan as the row sequential scan in which the optical signal is acquired, the time of row sequential scan in which the optical signal is acquired can be shortened, and the dynamic resolution is improved. Therefore, also in the present embodiment, a photoelectric conversion device capable of improving dynamic resolution as in the first embodiment is provided.

As in the driving method of the modified example of FIG. 6, the signal N/2 may be read from the frame memory 21a and subtracted it from the signal S at time t3a. In this case, as in the modified example of FIG. 6, the data capacity of the frame memory 21a can be reduced.

Fourth Embodiment

A photoelectric conversion device according to a fourth embodiment will be described. In the description of the present embodiment, portions having the same functions as those of the first to third embodiments are denoted by the same reference numerals, and detailed description thereof may be omitted or simplified.

The photoelectric conversion device of the present embodiment has a function of performing a determination based on a reset signal and changing the content of correction by correlated double sampling in accordance with the determination result. Since the other points are substantially the same as those of the first embodiment, description thereof will be omitted.

Figure 10:
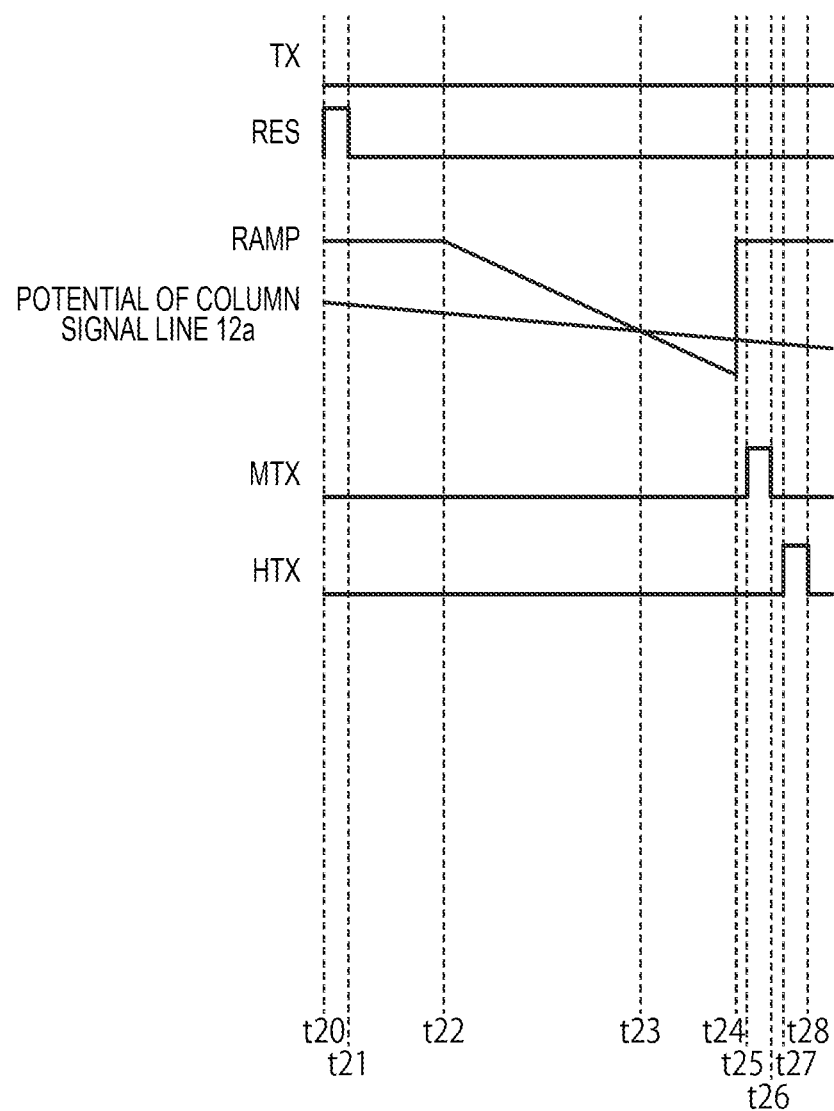
FIG. 10 is a timing chart illustrating an influence of a high-brightness object.

Prior to the description of the configuration of the present embodiment, the influence of a high-brightness object as a premise of the photoelectric conversion device of the present embodiment will be described with reference to FIG. 10. FIG. 10 is a timing chart for explaining the influence of a high-brightness object, and the operation timing of each control signal is the same as that in FIG. 4. Here, it is assumed that a high-brightness object is present within the imaging range in the reading scan started from the time t2 in FIG. 6 in the first embodiment. In such a case, as illustrated in FIG. 10, the potential of the column signal line 12a may decrease after the control signal RES at the time t21 becomes the low level and the reset of the floating diffusion FD is released. This is because a large amount of charge generated in the photoelectric conversion unit PD due to strong incident light from a high-brightness object overflows from the photoelectric conversion unit PD to the floating diffusion FD. In such a case, since the timing of the time t23 at which the magnitude relation between the potential of the reference signal RAMP input to the comparator 15a and the potential of the column signal line 12a is inverted is shifted, an error may occur in the value of the reset signal after AD conversion. For this reason, if a high-brightness object is present in the period from time t2 to time t3a, an error is caused in the reset signal due to the influence of the high-brightness object, which may cause a problem in that the time resolution is effectively lowered.

Figure 11:
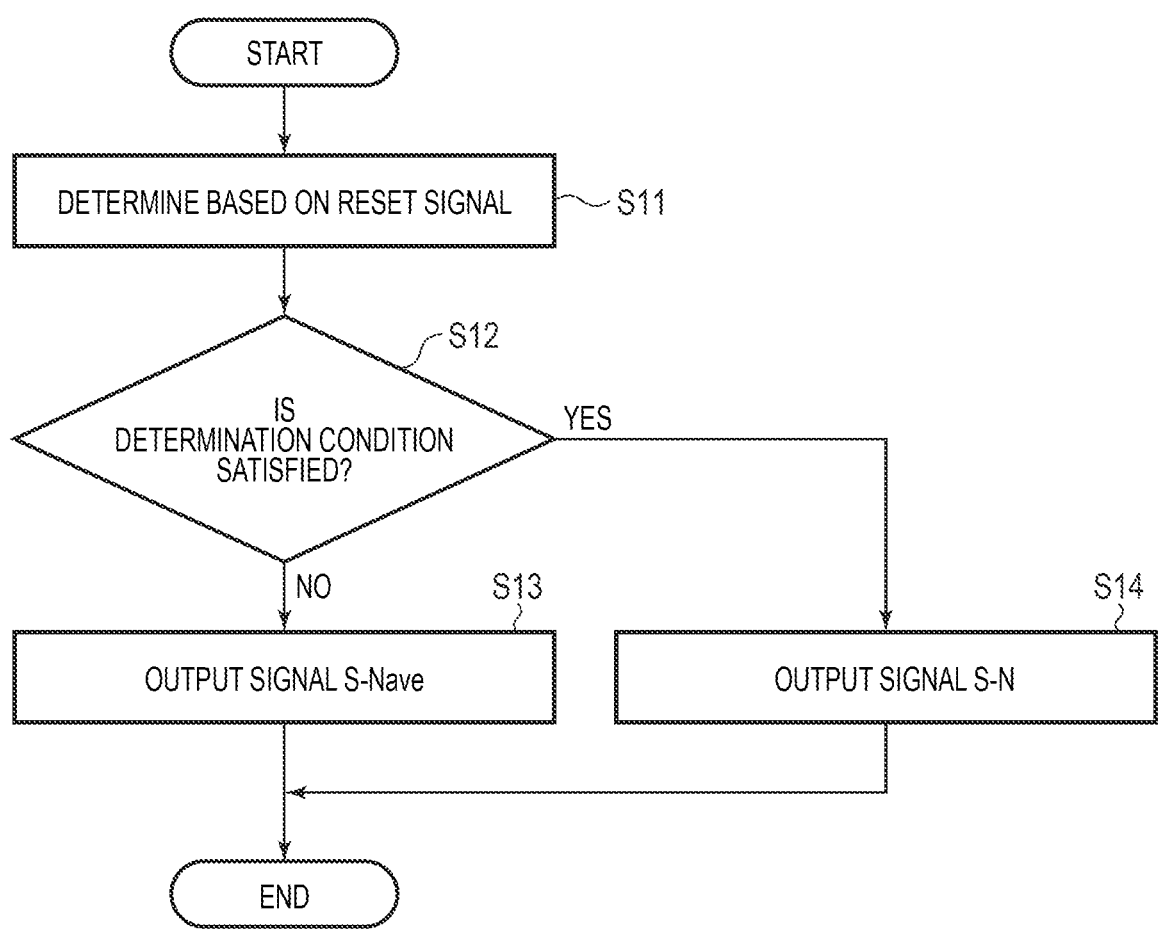
FIG. 11 is a flowchart illustrating a process of the photoelectric conversion device according to a fourth embodiment.

Therefore, in the present embodiment, the processing circuit 20a has a reset signal determination function. FIG. 11 is a flowchart illustrating a process of the photoelectric conversion device according to the present embodiment. The reset signal determination process in the processing circuit 20a will be described with reference to FIG. 11. It is assumed that the process of FIG. 11 is performed along with the reading scan from the frame memory 21a and the writing scan to the frame memory 21a in the process after the time t3a of FIG. 6.

In step S11, the processing circuit 20a determines whether or not the determination signal based on the reset signal satisfies a predetermined determination condition. The determination signal may be, for example, the signal N/2 stored in the frame memory 21a by the scan from time t2. The determination condition may be based on, for example, whether or not the signal N/2 read from the frame memory 21a exceeds a predetermined threshold value. Alternatively, the determination condition may be based on, for example, whether or not a signal corresponding to a difference between the signal N/2 read from the frame memory 21a and the signal N/2 calculated from the reset signal read out from the pixel 100 in the scan after the time t3a exceeds a predetermined threshold.

If the predetermined determination condition is not satisfied (NO in step S12), the process proceeds to step S13. This situation corresponds to the case where the above-described high-brightness object does not exist. If the predetermined determination condition is satisfied (YES in step S12), the process proceeds to step S14. This situation corresponds to the case where the high-brightness object exists.

In step S13, the processing circuit 20a outputs the signal S-Nave by subtracting two signals N/2 from the signal S. This process is similar to that described in the modified example of the first embodiment.

In step S14, the processing circuit 20a outputs the signal S–N by subtracting the reset signal read from the pixel 100 in the scan after the time t3a from the signal S without performing the right bit shift. That is, the reset signal read from the time t2 to the time t3a is not used for the correlated double sampling. Therefore, when the high-brightness object exists in the period from the time t2 to the time t3a and an error occurs in the reset signal, the reset signal can be prevented from being used for the correlated double sampling. Therefore, according to the present embodiment, it is possible to provide a photoelectric conversion device capable of suppressing a decrease in effective time resolution caused by a high-brightness object.

Fifth Embodiment

A photoelectric conversion device according to a fifth embodiment will be described. In the description of the present embodiment, portions having the same functions as those of the first to fourth embodiments are denoted by the same reference numerals, and detailed description thereof may be omitted or simplified.

The photoelectric conversion device of the present embodiment is a modified example in which the configuration of the pixel 100 of FIG. 2 of the first embodiment is changed. Other points are substantially the same as those of the first embodiment, and therefore, description thereof will be omitted.

Figure 12:
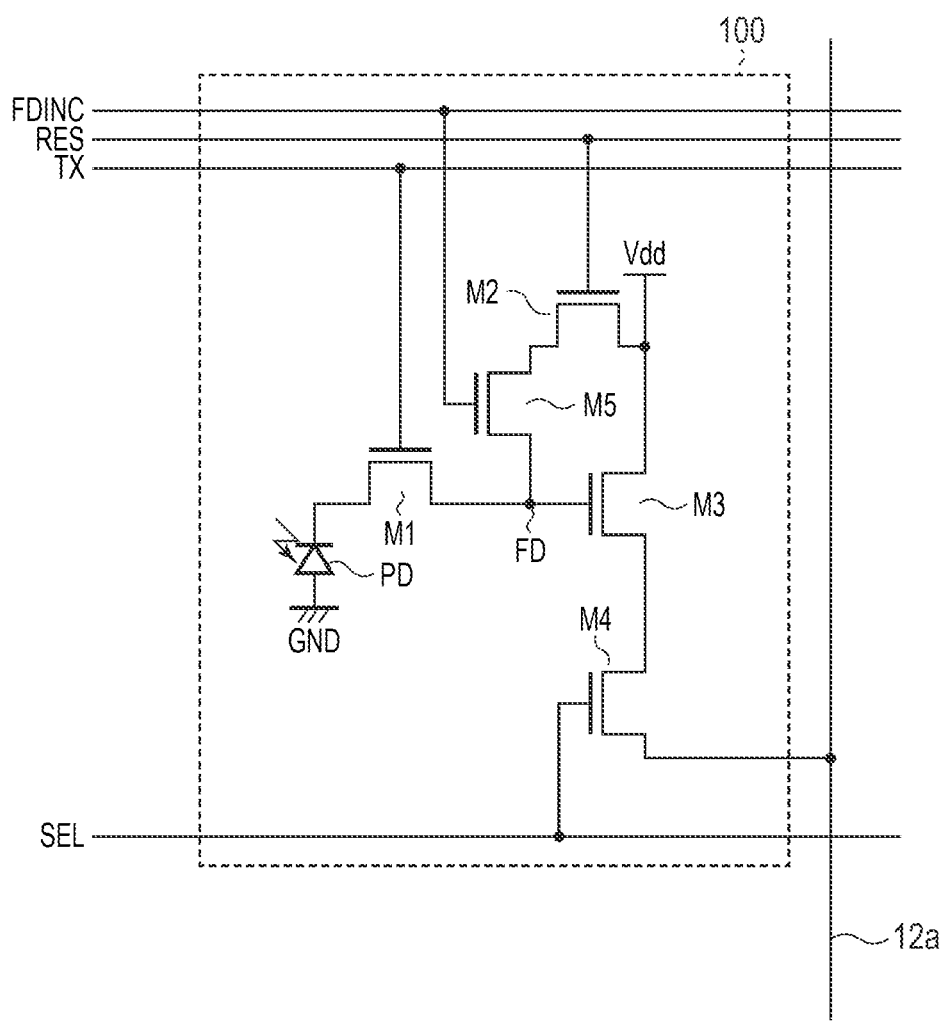
FIG. 12 is a circuit diagram of a pixel according to a fifth embodiment.

FIG. 12 is a circuit diagram of the pixel 100 according to the present embodiment. The pixel 100 further includes a capacitance switching transistor M5 in addition to the configuration of the pixel 100 of FIG. 2. The source node of the capacitance switching transistor M5 is connected to the floating diffusion FD, and the drain node of the capacitance switching transistor M5 is connected to the source node of the reset transistor M2. A control signal FDINC is supplied to the gate node of the capacitance switching transistor M5. When the control signal FDINC becomes the high level, the capacitance switching transistor M5 is turned on, and the parasitic capacitance of the floating diffusion FD increases. Thus, the gain of the signal output from the pixel 100 can be changed by changing the capacitance of the floating diffusion FD. The switching of the capacitance by the control signal FDINC may be performed for each frame or may be performed during a reading period of one row. According to the present embodiment, a photoelectric conversion device capable of switching gains is provided.

Sixth Embodiment

A photoelectric conversion device according to a sixth embodiment will be described. In the description of the present embodiment, portions having the same functions as those of the first to fifth embodiments are denoted by the same reference numerals, and detailed description thereof may be omitted or simplified.

The photoelectric conversion device of the present embodiment is a modified example in which the configuration of the pixel 100 of FIG. 2 of the first embodiment is changed. Other points are substantially the same as those of the first embodiment, and therefore, description thereof will be omitted.

Figure 13:
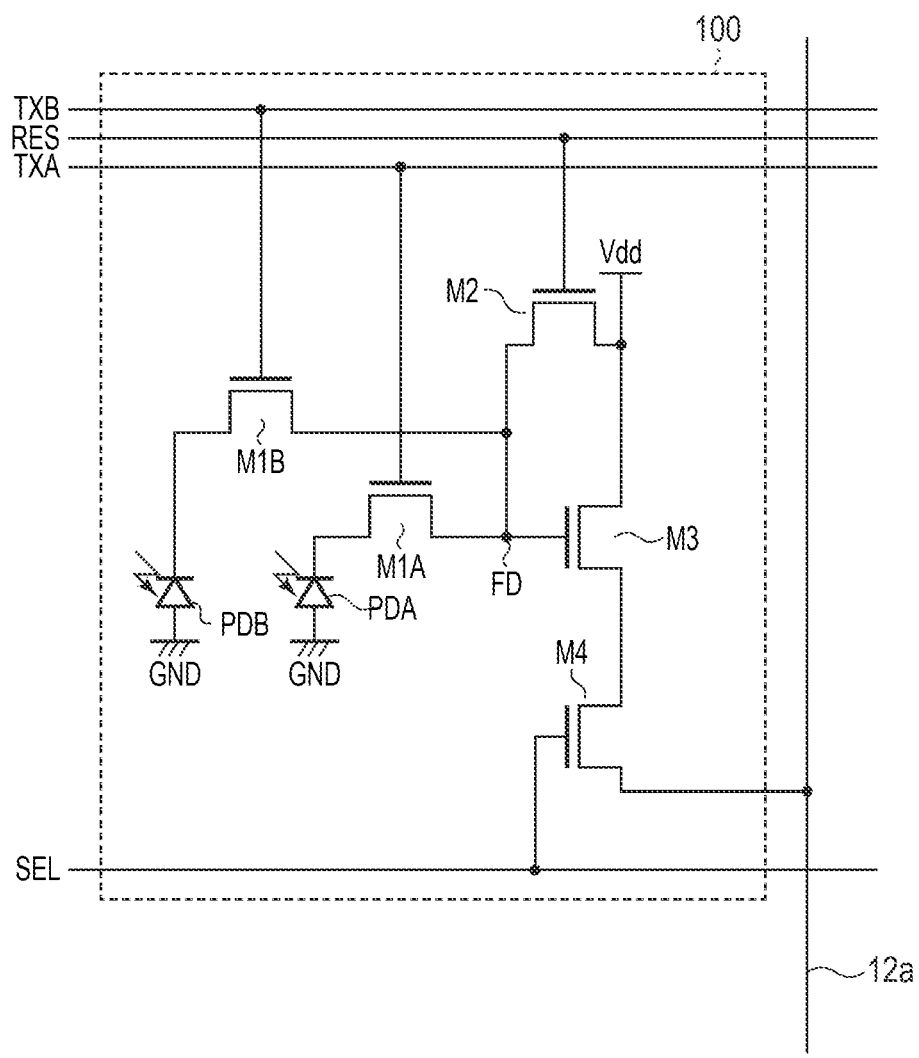
FIG. 13 is a circuit diagram of a pixel according to a sixth embodiment.

FIG. 13 is a circuit diagram of the pixel 100 according to the present embodiment. The pixel 100 includes two photoelectric conversion units PDA and PDB and two transfer transistors M1A and M1B. The two photoelectric conversion units PDA and PDB are configured such that light passing through different regions of the same microlens is incident thereon.

The transfer transistor M1A is provided corresponding to the photoelectric conversion unit PDA, and a control signal TXA is supplied to the gate node of the transfer transistor M1A. When the control signal TXA becomes the high level, charges generated by light reception and accumulated in the photoelectric conversion unit PDA are transferred to the floating diffusion FD via the transfer transistor M1A.

The transfer transistor M1B is provided corresponding to the photoelectric conversion unit PDB, and a control signal TXB is supplied to the gate node of the transfer transistor M1B. When the control signal TXB becomes the high level, charges generated by light reception and accumulated in the photoelectric conversion unit PDB are transferred to the floating diffusion FD via the transfer transistor M1B.

According to the pixel 100 of the present embodiment, a signal based on the charges accumulated in the photoelectric conversion unit PDA and a signal based on the charges accumulated in the photoelectric conversion unit PDB can be acquired. These signals can be used as signals for ranging such as focus detection by a phase difference detection method. According to the present embodiment, a photoelectric conversion device capable of acquiring a signal for ranging is provided.

Although modified examples of the configuration of the pixel 100 is illustrated in the fifth embodiment and the sixth embodiment, the configuration example of the pixel 100 is not particularly limited. For example, one pixel 100 may include a plurality of select transistors and a plurality of column signal lines. In this case, the column signal lines that output signals from the pixel 100 can be selected by controlling the plurality of select transistors.

Seventh Embodiment

A photoelectric conversion device according to a seventh embodiment will be described. In the description of the present embodiment, portions having the same functions as those of the first to sixth embodiments are denoted by the same reference numerals, and detailed description thereof may be omitted or simplified.

The photoelectric conversion device of the present embodiment is a modified example in which the circuit configuration around the comparator 15a of FIG. 2 of the first embodiment is changed. Other points are substantially the same as those of the first embodiment, and therefore, description thereof will be omitted.

Figure 14:
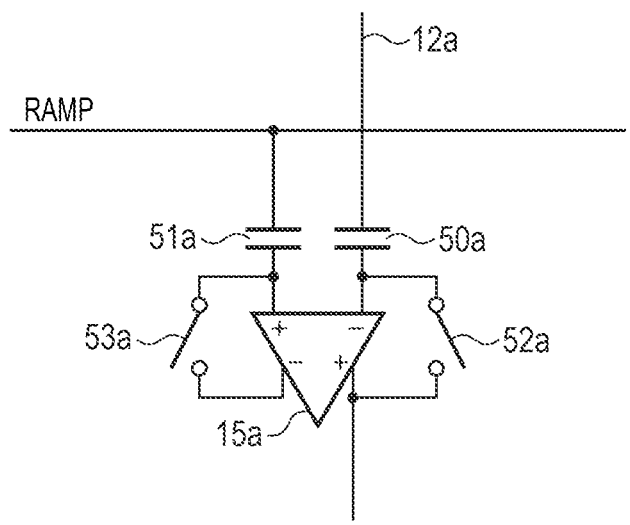
FIG. 14 is a circuit diagram of a comparison circuit according to a seventh embodiment.

FIG. 14 is a circuit diagram of a comparison circuit according to the present embodiment. As illustrated in FIG. 14, the comparator 15a of the present embodiment is a fully-differential type comparator having an inverting input node, a non-inverting input node, an inverting output node, and a non-inverting output node. Capacitors 50a and 51a and switches 52a and 53a are connected to the comparator 15a. The capacitor 50a is arranged between the column signal line 12a and the inverting input node. The capacitor 51a is arranged between the wiring through which the reference signal RAMP is transmitted and the non-inverting input node. The switch 52a is arranged between the inverting input node and the non-inverting output node. The switch 52a is arranged between the non-inverting input node and the inverting output node. By controlling the switches 52a and 53a to on, the offset level of the comparison circuit of FIG. 14 can be reset to a voltage corresponding to the difference between the potential of the column signal line 12a and the potential of the reference signal RAMP. This process may be referred to as an auto-zero operation. According to the present embodiment, a photoelectric conversion device capable of performing an auto-zero operation in a comparator for AD conversion is provided.

Eighth Embodiment

A photoelectric conversion device according to an eighth embodiment will be described. In the description of the present embodiment, portions having the same functions as those of the first to seventh embodiments are denoted by the same reference numerals, and detailed description thereof may be omitted or simplified.

The photoelectric conversion device of the present embodiment is a modified example in which the photoelectric conversion device of the first embodiment is constituted by a plurality of substrates. Other points are substantially the same as those of the first embodiment, and therefore, description thereof will be omitted.

Figure 15:
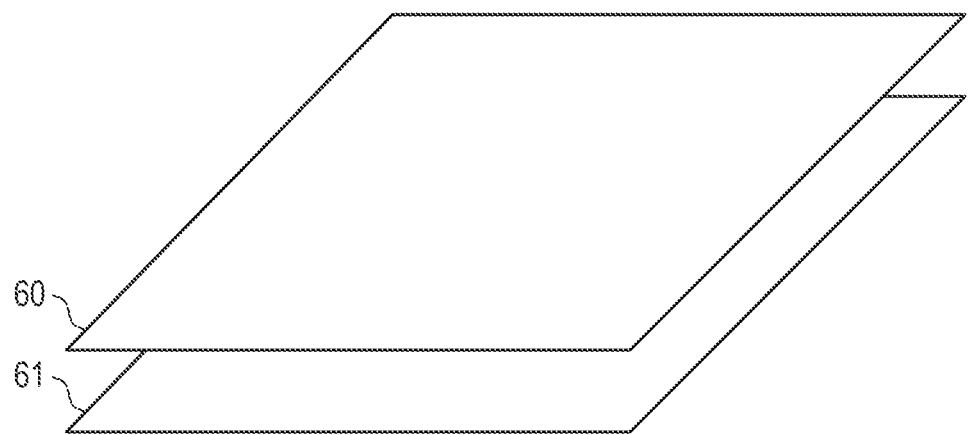
FIG. 15 is a schematic diagram illustrating a structure of a photoelectric conversion device according to an eighth embodiment.

FIG. 15 is a schematic diagram illustrating a structure of the photoelectric conversion device according to the present embodiment. The photoelectric conversion device of the present embodiment includes a pixel substrate 60 and a circuit substrate 61 stacked on each other. The pixel array 10 described in the first embodiment is arranged on the pixel substrate 60. At least a part of the circuits other than the pixel array 10 described in the first embodiment are arranged in the circuit substrate 61. All circuits other than the pixel array 10 described in the first embodiment may be arranged in the circuit substrate 61. According to the present embodiment, a stacked type photoelectric conversion device is provided.

The structure of the photoelectric conversion device may be a stacked type of three or more layers. In a case where the photoelectric conversion device is the three-layer type, the pixel array 10 may be arranged in the first substrate, the processing circuit 20a may be arranged in the second substrate, and the frame memory 21a and the output circuit 22a may be arranged in the third substrate. The current source 13a, the comparator 15a, the first memory 16a, and the second memory 17a may be arranged in the second substrate.

Ninth Embodiment

Figure 16:
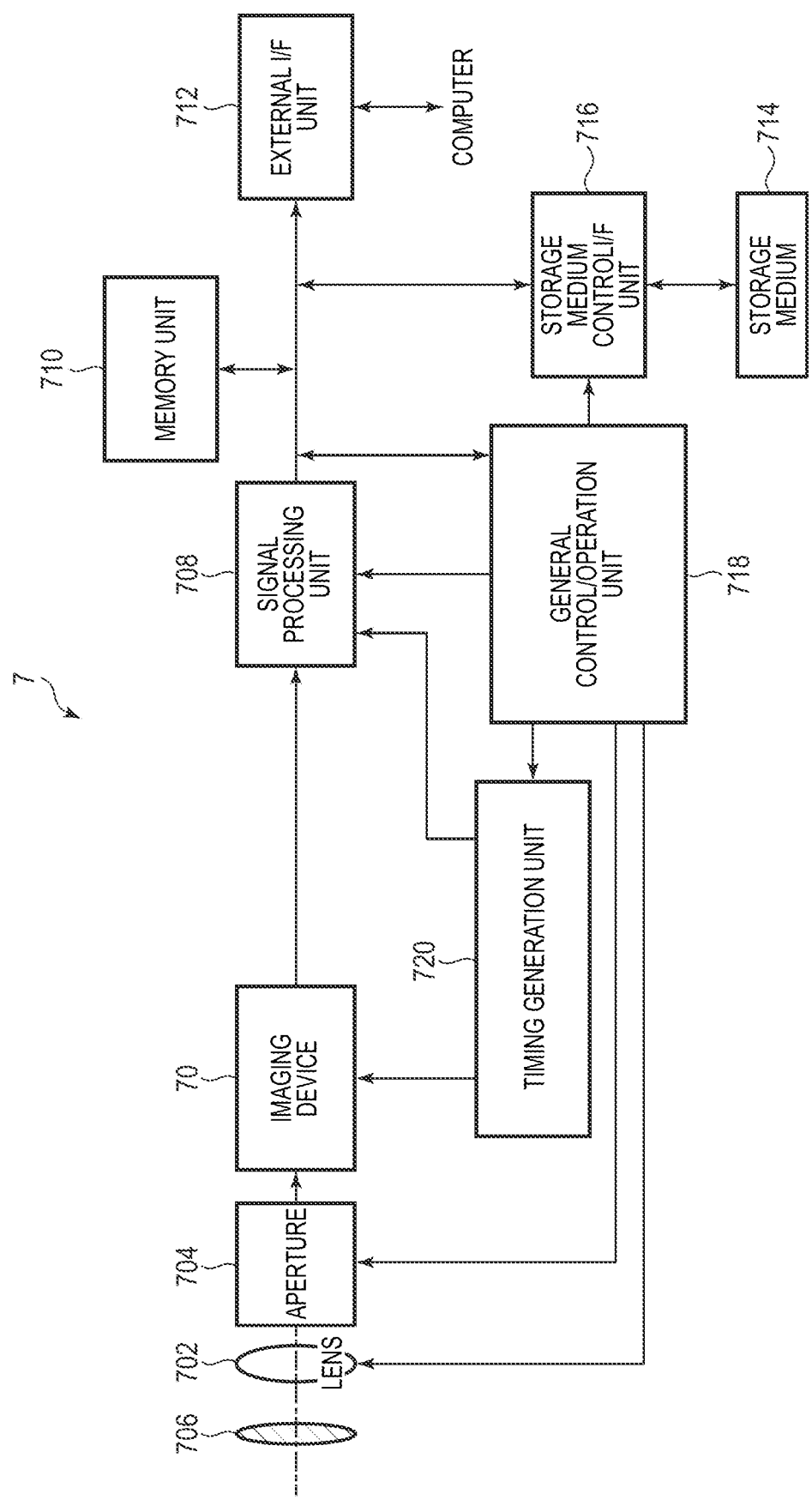
FIG. 16 is a block diagram of equipment according to a ninth embodiment.

The photoelectric conversion device in the above-described embodiments can be applied to various equipment. Examples of the equipment include a digital still camera, a digital camcorder, a camera head, a copier, a fax machine, a cellular phone, an in-vehicle camera, an observation satellite, and a surveillance camera. FIG. 16 is a block diagram of a digital still camera as an example of equipment.

The equipment 7 illustrated in FIG. 16 includes a barrier 706, a lens 702, an aperture 704, and an imaging device 70 (an example of a photoelectric conversion device). The equipment 7 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of the object on the imaging device 70. The aperture 704 varies the amount of light passing through the lens 702. The imaging device 70 is configured as in the above-described embodiment, and converts an optical image formed by the lens 702 into image data (image signal). The signal processing unit 708 performs various types of correction, data compression, and the like on the imaging data output from the imaging device 70. The timing generation unit 720 outputs various timing signals to the imaging device 70 and the signal processing unit 708. The general control/operation unit 718 controls the overall digital still camera, and the memory unit 710 temporarily stores image data. The storage medium control I/F unit 716 is an interface for storing or reading image data in or from the storage medium 714, and the storage medium 714 is a removable storage medium such as a semiconductor memory for storing or reading image data. The external I/F unit 712 is an interface for communicating with an external computer or the like. The timing signal or the like may be input from the outside of the equipment. Further, the equipment 7 may include a display device (a monitor, an electronic view finder, or the like) for displaying information obtained by the photoelectric conversion device. The equipment includes at least the photoelectric conversion device. Further, the equipment 7 includes at least one of an optical device, a control device, a processing device, a display device, a storage device, and a mechanical device that operates based on information obtained by the photoelectric conversion device. The mechanical device is a movable unit (for example, a robot arm) that operates upon receipt of a signal from the photoelectric conversion device.

Each pixel may include a plurality of photoelectric conversion units (a first photoelectric conversion unit and a second photoelectric conversion unit). The signal processing unit 708 may be configured to process a pixel signal based on charges generated in the first photoelectric conversion unit and a pixel signal based on charges generated in the second photoelectric conversion unit, and acquire distance information from the imaging device 70 to the object.

Tenth Embodiment

Figure 17A:
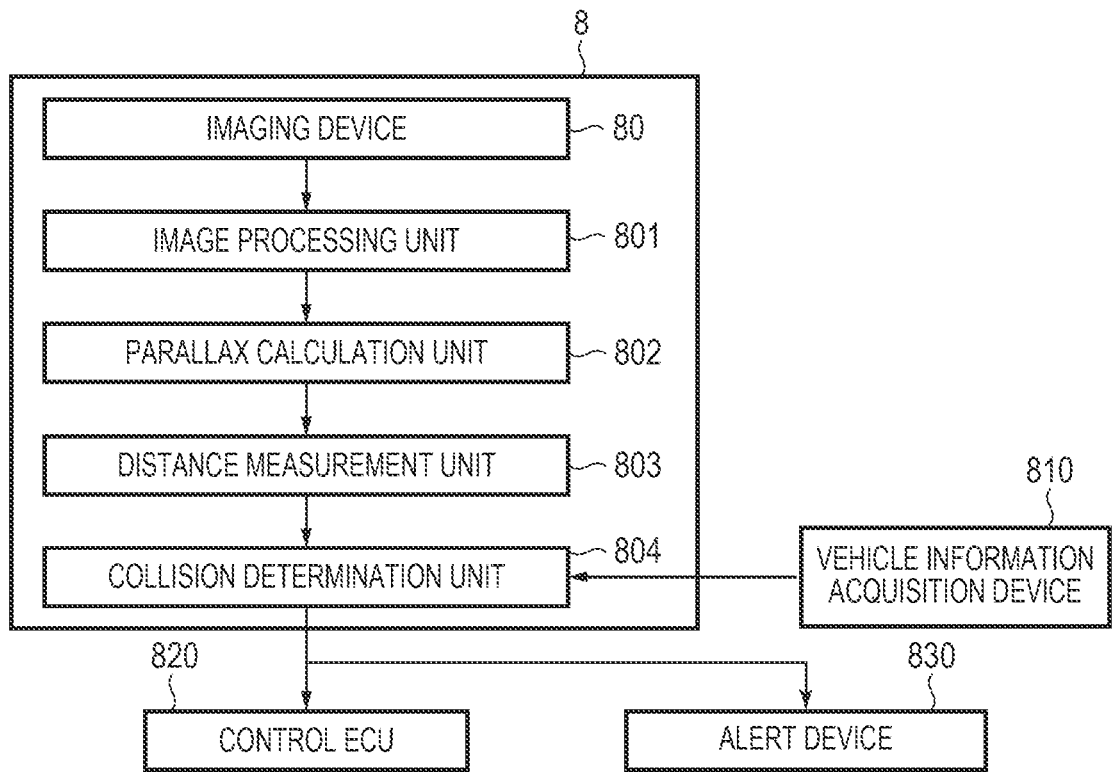
FIGS. 17A and 17B are block diagrams of equipment according to a tenth embodiment.
Figure 17B:
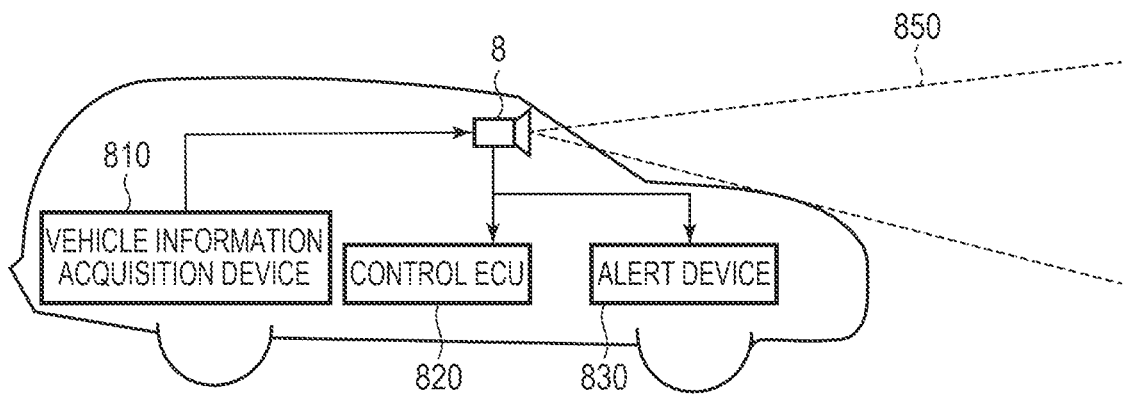

FIGS. 17A and 17B are block diagrams of equipment related to the in-vehicle camera according to the present embodiment. The equipment 8 includes the imaging device 80 (an example of a photoelectric conversion device) according to the above-described embodiment, and a signal processing device (processing device) that processes a signal from the imaging device 80. The equipment 8 includes an image processing unit 801 that performs image processing on a plurality of image data acquired by the imaging device 80, and a parallax calculation unit 802 that calculates parallax (phase difference of parallax images) from the plurality of image data acquired by the equipment 8. Further, the equipment 8 includes a distance measurement unit 803 that calculates a distance to the object based on the calculated parallax, and a collision determination unit 804 that determines whether there is a possibility of collision based on the calculated distance. Here, the parallax calculation unit 802 and the distance measurement unit 803 are an example of a distance information acquisition means that acquires distance information to an object. That is, the distance information is information related to parallax, defocus amount, distance to the object, and the like. The collision determination unit 804 may determine the possibility of collision using any of the distance information. The distance information acquisition means may be realized by dedicatedly designed hardware, or may be realized by a software module. It may be realized by a field programmable gate array (FPGA), an application specific integrated circuit (ASIC) or a combination thereof.

The equipment 8 is connected to the vehicle information acquisition device 810, and can acquire vehicle information such as a vehicle speed, a yaw rate, and a steering angle. A control ECU 820, which is a control device that outputs a control signal for generating braking force to the vehicle based on the determination result of the collision determination unit 804, is connected to the equipment 8. The equipment 8 is also connected to an alert device 830 that issues an alert to the driver based on the determination result of the collision determination unit 804. For example, when the possibility of collision is high as the determination result of the collision determination unit 804, the control ECU 820 performs vehicle control for avoiding collision or reducing damage by applying a brake, returning an accelerator, suppressing engine output, or the like. The alert device 830 alerts the user by sounding an alarm such as a sound, displaying alarm information on a screen of a car navigation system or the like, and applying vibration to a seatbelt or steering. The equipment 8 functions as a control means for controlling the operation of controlling the vehicle as described above.

In the present embodiment, an image of the periphery of the vehicle, for example, the front or the rear is captured by the equipment 8. FIG. 17B illustrates equipment when capturing an image of the front of the vehicle (image capturing range 850). The vehicle information acquisition device 810 serving as an imaging control means sends an instruction to the equipment 8 or the imaging device 80 to perform an imaging operation. With such a configuration, the accuracy of ranging can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above-described embodiments, and various modifications are possible. For example, an example in which a configuration of a part of any embodiment is added to another embodiment or an example in which a configuration of a part of any embodiment is replaced with a configuration of a part of another embodiment is also an embodiment of the present invention.

Although the processing circuits 20a and 20b and the frame memories 21a and 21b are arranged in the photoelectric conversion device in the above-described embodiment, they may be arranged outside the photoelectric conversion device. In this case, the photoelectric conversion device outputs the optical signal and the plurality of reset signals to the outside, and a signal processing circuit outside the photoelectric conversion device can perform digital correlated double sampling processing using these signals.

The disclosure of this specification includes a complementary set of the concepts described in this specification. That is, for example, if the description of "A is B" (A=B) is provided in this specification, this specification is intended to disclose or suggest that "A is not B" even if the description of "A is not B" (A B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-128516, filed Aug. 4, 2021, which is hereby incorporated by reference herein in its entirety.

What is claimed is:

1. A photoelectric conversion device comprising:
   a pixel array including a plurality of pixels arranged to form a plurality of rows, and each pixel configured to output a signal corresponding to incident light by photoelectric conversion;
   a scanning circuit configured to perform scanning for sequentially outputting a signal from each pixel on a row basis; and
   a processing circuit configured to process a signal output from each pixel,
   wherein the processing circuit corrects, based on a first reset signal and a second reset signal each based on a reset state of the pixel, an optical signal based on the incident light,
   wherein the scanning circuit performs scanning for outputting the optical signal and the first reset signal from the pixel by scans performed in different periods,
   wherein the scanning circuit performs scanning for outputting the optical signal and the second reset signal from the pixel by a scan, and
   wherein the first reset signal, the second reset signal, and the optical signal are output from the pixel in a frame period in which signals to be used for generating a frame is output.

2. The photoelectric conversion device according to claim 1 further comprising a frame memory,
   wherein the processing circuit reads the first reset signal from the frame memory to correct the optical signal, and stores a corrected optical signal in the frame memory.

3. The photoelectric conversion device according to claim 1, wherein the processing circuit changes a content of correction of the optical signal in accordance with a result of determination based on the first reset signal.

4. The photoelectric conversion device according to claim 3, wherein the processing circuit performs the determination by comparing a signal based on a difference between the first reset signal and the second reset signal with a threshold value.

5. The photoelectric conversion device according to claim 3, wherein the processing circuit performs the determination by comparing a signal based on the first reset signal with a threshold value.

6. The photoelectric conversion device according to claim 3, wherein the processing circuit determines, in accordance with the result of the determination, whether or not both the first reset signal and the second reset signal are used in correcting the optical signal.

7. The photoelectric conversion device according to claim 1, wherein the processing circuit performs the correction by subtracting ½ times of the first reset signal and ½ times of the second reset signal from the optical signal.

8. The photoelectric conversion device according to claim 1, wherein the processing circuit performs the correction by subtracting an average of the first reset signal and the second reset signal from the optical signal.

9. The photoelectric conversion device according to claim 1, wherein the scanning circuit performs scanning for outputting a plurality of the first reset signals by another scan.

10. The photoelectric conversion device according to claim 9, wherein when the total number of the plurality of first reset signals and the second reset signal is n, the processing circuit performs the correction by subtracting 1/n times of the first reset signal and 1/n times of the second reset signal from the optical signal.

11. The photoelectric conversion device according to claim 9, wherein the processing circuit performs the correction by subtracting an average of the plurality of first reset signals and the second reset signal from the optical signal.

12. Equipment comprising:
the photoelectric conversion device according to claim 1; and
at least any one of:
an optical device adapted for the photoelectric conversion device,
a control device configured to control the photoelectric conversion device,
a processing device configured to process a signal output from the photoelectric conversion device,
a display device configured to display information obtained by the photoelectric conversion device,
a storage device configured to store information obtained by the photoelectric conversion device, and
a mechanical device configured to operate based on information obtained by the photoelectric conversion device.

13. The equipment according to claim 12, wherein the processing device processes image signals generated by a plurality of photoelectric conversion units, respectively, and acquires distance information on a distance from the photoelectric conversion device to an object.

14. The photoelectric conversion device according to claim 1, wherein the pixel separately outputs the first reset signal, the second reset signal, and the optical signal at different times.

15. A photoelectric conversion device comprising:
a pixel array including a plurality of pixels arranged to form a plurality of rows, and each pixel configured to output a signal corresponding to incident light by photoelectric conversion; and
a scanning circuit configured to perform scanning for sequentially outputting a signal from each pixel on a row basis,
wherein the scanning circuit performs scanning for:
outputting a first reset signal based on a reset state of the pixel from the pixel in a first scan,
outputting an optical signal based on the incident light from the pixel in a second scan performed in a period different from the first scan, and
outputting a second reset signal based on a reset state of the pixel from the pixel in the first scan or the second scan,
wherein no optical signal is output from the pixel in the first scan, and
wherein the first reset signal, the second reset signal, and the optical signal are output from the pixel in a frame period in which signals to be used for generating a frame is output.

16. The photoelectric conversion device according to claim 15, wherein the pixel separately outputs the first reset signal, the second reset signal, and the optical signal at different times.

17. A photoelectric conversion device comprising:
a pixel array including a plurality of pixels arranged to form a plurality of rows, each pixel including a photoelectric conversion unit, and each pixel configured to output a signal corresponding to incident light by photoelectric conversion;
a scanning circuit configured to perform scanning for sequentially outputting a signal from each pixel on a row basis; and
a processing circuit configured to process a signal output from each pixel,
wherein the processing circuit corrects, based on a first reset signal and a second reset signal each based on a reset state of the pixel, an optical signal based on the incident light,
wherein the scanning circuit performs scanning for outputting the optical signal and the first reset signal from the pixel by scans performed in different periods,
wherein the scanning circuit performs scanning for outputting the optical signal and the second reset signal from the pixel by a single scan, and
wherein a shutter scan for resetting the photoelectric conversion unit and releasing the reset of the photoelectric conversion unit is performed between a scan for outputting the first reset signal from the pixel and the single scan.

18. The photoelectric conversion device according to claim 17, wherein the pixel separately outputs the first reset signal, the second reset signal, and the optical signal at different times.

* * * * *